(12) United States Patent
Magri et al.

(10) Patent No.: US 10,014,933 B2
(45) Date of Patent: Jul. 3, 2018

(54) TRANSMITTING COMMUNICATIONS TRAFFIC ACROSS AN OPTICAL COMMUNICATION NETWORK

(71) Applicant: Telefonaktiebolaget L M Ericsson (publ), Stockholm (SE)

(72) Inventors: Roberto Magri, Pisa (IT); Giulio Bottari, Pisa (IT)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 15/028,937

(22) PCT Filed: Oct. 15, 2013

(86) PCT No.: PCT/EP2013/071491
§ 371 (c)(1),
(2) Date: Apr. 12, 2016

(87) PCT Pub. No.: WO2015/055230
PCT Pub. Date: Apr. 23, 2015

(65) Prior Publication Data
US 2016/0254860 A1 Sep. 1, 2016

(51) Int. Cl.
*H04B 10/00* (2013.01)
*H04B 10/07* (2013.01)
(Continued)

(52) U.S. Cl.
CPC ......... *H04B 10/0705* (2013.01); *H04B 10/25* (2013.01); *H04L 45/24* (2013.01);
(Continued)

(58) Field of Classification Search
CPC ..... H04B 10/0705; H04B 10/25; H04L 45/24; H04L 45/502; H04L 45/62; H04Q 11/0062; H04Q 2011/0077; H04Q 2011/0081
(Continued)

(56) References Cited

U.S. PATENT DOCUMENTS 8,565,610 B2 * 10/2013 Sprague ............. H04Q 11/0062
398/158
2002/0039211 A1 * 4/2002 Shen ...................... B82Y 15/00
398/9
(Continued)

OTHER PUBLICATIONS

PCT International Search Report, dated Jun. 24, 2014, in connection with International Application No. PCT/EP2013/071491, all pages.
(Continued)

*Primary Examiner* — Agustin Bello
(74) *Attorney, Agent, or Firm* — Leffler Intellectual Property Law, PLLC

(57) ABSTRACT

A method of transmitting communications traffic in an optical communication network comprising a plurality of nodes, the method comprising, at a source node: receiving communications traffic to be transmitted across the optical communication network to a target node; obtaining a path sequence defining an order in which a plurality of optical paths from the source node to the target node across the optical communication network are to be used, at least part of each optical path being spatially separate from each other optical path; and transmitting the communications traffic as a series of traffic portions, each traffic portion being transmitted for a respective preselected transmission period on a respective optical path according to the path sequence.

17 Claims, 16 Drawing Sheets

(51) Int. Cl.
  *H04L 12/707* (2013.01)
  *H04B 10/25* (2013.01)
  *H04Q 11/00* (2006.01)
  *H04L 12/723* (2013.01)
  *H04L 12/721* (2013.01)

(52) U.S. Cl.
  CPC ........ *H04Q 11/0062* (2013.01); *H04L 45/502* (2013.01); *H04L 45/62* (2013.01); *H04Q 2011/0077* (2013.01); *H04Q 2011/0081* (2013.01)

(58) Field of Classification Search
  USPC .............................. 398/154, 140–141, 45–57
  See application file for complete search history.

(56) References Cited

U.S. PATENT DOCUMENTS

| | | | | |
|---|---|---|---|---|
| 2003/0117678 A1* | 6/2003 | Chang | ................ | H04Q 11/0062 398/49 |
| 2004/0037330 A1* | 2/2004 | Ohkuma | ............. | H04J 14/0226 370/535 |
| 2004/0258407 A1 | 12/2004 | Maciocco et al. | | |
| 2009/0034976 A1* | 2/2009 | Sprague | ............. | H04Q 11/0062 398/79 |
| 2010/0119225 A1 | 5/2010 | Snawerdt | | |
| 2016/0254860 A1* | 9/2016 | Magri | ..................... | H04L 45/24 398/20 |

OTHER PUBLICATIONS

Elmurod Talipov et al., Path Hopping Based on Reverse AODV for Security, APNOMS 2006, LNCS 4238, pp. 574-577.

Jim Zyren et al., Does Frequency Hopping Enhance Security, 3 pages.

Opterna for Enlightened Networks, Threats to Fiber-Optic Infrastructures, iDEFENSE, A Blackhat Federal Briefing, Oct. 1-2, 2003, 38 pages.

Oyster Optics, Inc., Securing Fiber Optic Communications against Optical Tapping Methods, 20 pages.

Roberto Sabella et al., A Multilayer Solution for Path Provisioning in New-Generation Optical/MPLS Networks, Journal of Lightwave Technology, vol. 21, No. 5, May 2003, pp. 1141-1155.

International Preliminary Report on Patentability, dated Apr. 19, 2016, in connection with International Application No. PCT/EP2013/071491, all pages.

* cited by examiner

TRANSMITTING COMMUNICATIONS TRAFFIC ACROSS AN OPTICAL COMMUNICATION NETWORK

TECHNICAL FIELD

The invention relates to a method of transmitting communications traffic in an optical communication network comprising a plurality of nodes, a method of receiving communications traffic in an optical communication network comprising a plurality of nodes, a method of operating an optical communication network comprising a plurality of nodes, an optical communication network transmitter module, an optical communication network receiver module, and an optical communication network.

BACKGROUND

Fibre tapping attacks are a real threat in optical networks. The tap consists, for example, of bending the fibre to the point that it leaks light, enabling an attacker to gain access to communications traffic being carried by optical channels propagating through the fibre. When a successful tap is made, packet-sniffer software can be used to filter through the packet headers of the traffic. This means that specified IP addresses, MAC addresses or DNS information can be gathered from the tapped traffic. If an attacker is successful in using an unobtrusive method to retrieve traffic directly from the fibre optic cable, then the attacker does not need access to a network in order to access the communications traffic being sent across it. Encryption techniques can improve the security of the traffic but encryption can be broken.

Fibre tapping techniques may be hard to be detected since the loss introduced by the tapping device may be so low that network management and monitoring systems may not be able to identify the attack. In some cases, attackers cut the fibre at a given point so that the network operator detects a link failure. While the operator goes in field to repair the fibre cut, the attacker applies a fibre tap some kilometers away from the fibre cut point. By operating during this network maintenance period, when the fibre is under repair, an attacker can avoid a network monitoring system detecting the optical power transient that typically occurs when a fibre tap is inserted. After the fibre repair is complete, it is impossible to detect whether a tap has been inserted because the effect of the tap on the quality of the optical signal is very limited and could be easily confused with the effect of a patch used to repair the cut fibre. Other fibre tapping methods are also used, including the permanent installation of optical splitters on an optical fibre to enable continuous eavesdropping. This technique can be easily used along hundreds of kilometers of unmonitored and un-watched optical network cable.

The most obvious way to protect optical fibre cables from this type of attack is to prevent physical access to them. However there are millions of kilometers of optical fibre cables spanning across the globe and it is not possible to protect optical fibre cables out in the field in the way in which the central offices of communication networks are protected.

Current solutions to the problem of fibre tapping attacks are either based on protection at higher network layers, specifically cryptography and steganography, or on the use of complex, expensive and not very reliable network monitoring infrastructures, such as a combination of embedded optical time domain reflectometry, OTDR, vibration monitoring systems, and optical network parameter monitoring. US2010/119225 discloses a transceiver card for providing secure optical transmission over optical fibre. The transceiver card comprises an optical time domain reflectometer connected to the receiver side of the card, upstream from the receiver. Cryptography may be used to protect communications traffic content but not to prevent access to the traffic. A malicious attacker with access to encrypted data can, if motivated and with a suitable amount of money and time, successfully open the encryption. The methods based on monitoring systems to detect malicious intrusion on an optical link are very expensive, cannot react to fast transients in optical signal power, and are prone to false alarms and to alarms failing to go off; a threshold set too high can fail to detect an attack while a threshold set too low will generate many false alarms as a consequence of changes in fibre parameters due to normal ageing, stress, faults, etc.

SUMMARY

It is an object to provide an improved method of transmitting communications traffic in an optical communication network comprising a plurality of nodes. It is a further object to provide an improved method of receiving communications traffic in an optical communication network comprising a plurality of nodes. It is a further object to provide an improved method of operating an optical communication network comprising a plurality of nodes. It is a further object to provide an improved optical communication network transmitter module. It is a further object to provide an improved optical communication network receiver module. It is a further object to provide an improved optical communication network.

A first embodiment of the invention provides a method of transmitting communications traffic in an optical communication network comprising a plurality of nodes. The method comprises receiving communications traffic at a source node, the communications traffic to be transmitted across the optical communication network to a target node. The method comprises, at the source node, obtaining a path sequence. The path sequence defines an order in which a plurality of optical paths from the source node to the target node across the optical communication network are to be used. At least part of each optical path is spatially separate from each other optical path. The method comprises, at the source node, transmitting the communications traffic as a series of traffic portions. Each traffic portion is transmitted for a respective preselected transmission period on a respective optical path according to the path sequence.

The method may ensure that even where a fibre tapping attack occurs, the attacker is not able to access the whole of the communications traffic being transmitted. The method may therefore provide a further line of defence against malicious eavesdropping and tapping of optical fibres. The method may also be used in conjunction with the prior art methods of protection implemented at higher network layers, specifically cryptography and steganography, because the action of switching transmission of the communications traffic onto different optical paths is transparent to the network transport layers where conventional security methods and protocols are provided. The method is similarly transparent to embedded optical time domain reflectometry, vibration monitoring systems, and optical network parameter monitoring and may be used in conjunction with these security systems also.

The method may enable the source of the communications traffic to implement a defence to a fibre tapping attack even when they do not directly control the optical fibres across which the communications traffic is to be transmitted.

The method does not require radical changes in communication network equipment architectures and may therefore avoid the high implementation costs associated with prior art security systems, such as surveillance and monitoring systems.

In an embodiment, the communications traffic in each said traffic portion can only be reconstructed when recombined with at least one other said traffic portion. This means that one single traffic portion is never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker.

The amount of traffic in a traffic portion is set by setting the transmission period so that the amount of traffic is such that it can only be reconstructed when recombined with at least one other said traffic portion.

In an embodiment, the method comprises obtaining information identifying a respective different optical channel assigned to each said optical path and digitally wrapping the communications traffic. The digitally wrapped communications traffic is transmitted as a series of traffic portions, each traffic portion being transmitted on the optical channel assigned to its respective optical path. Switching the digitally wrapped traffic between different optical channels enables the switching to be implemented in the digital domain rather than at the optical layer. This may enable faster switching times to be achieved, which may mitigate any transmission performance degradation caused by the optical path hopping.

In an embodiment, the communications traffic is transmitted on a single optical channel. The optical channel is transmitted on each optical path of the path sequence for a respective preselected transmission period.

In an embodiment, the method comprises obtaining information identifying a respective different optical channel assigned to each said optical path and the communications traffic is digitally wrapped communications traffic. The digitally wrapped communications traffic is transmitted as a series of traffic portions, each traffic portion being transmitted on the optical channel assigned to its respective optical path. Switching the digitally wrapped traffic between different optical channels enables the switching to be implemented in the digital domain rather than at the optical layer. This may enable faster switching times to be achieved, which may mitigate any transmission performance degradation caused by the optical path hopping.

In an embodiment, the digitally wrapped traffic is transmitted on each optical channel for said transmission period.

In an embodiment, transmission of the digitally wrapped traffic is switched onto the optical channel of the next optical path in the path sequence on the elapsing of a timer.

In an embodiment, transmission of the digitally wrapped traffic is switched onto the optical channel of the next optical path in the path sequence in response to the detection of a false alarm signal. Detection of the false alarm signal initiates a switching mechanism arranged to switch transmission of the digitally wrapped traffic onto the optical channel of the next optical path in the path sequence. Using an existing switching mechanism within an optical communication network may offer the advantage of ease of implementation. No hardware protocols may need to be changed.

In an embodiment, the switching mechanism is a protection switching mechanism. The action of switching the traffic portions onto different optical paths for anti-tapping purposes may therefore have the same complexity as switching traffic for failure recovery purposes.

In an embodiment, the communications traffic is wrapped in a multi protocol label switching, MPLS, label switched path, LSP, and the MPLS LSP is transmitted as a series of traffic portions. The action of switching LSPs among alternative paths for anti-tapping purposes has the same complexity as switching an LSP for failure recovery purposes.

In an embodiment, the received communications traffic is wrapped in a plurality of MPLS LSPs and the MPLS LSPs are each transmitted as a series of traffic portions. Each MPLS LSP commences transmission at a different optical path of the path sequence. The MPLS LSPs are transmitted simultaneously.

In an embodiment, the communications traffic is wrapped in an optical transport network, OTN, container and the OTN container is transmitted as a series of traffic portions.

In an embodiment, the OTN container is an optical data unit, ODU, such as ODU1, ODU2, etc.

In an embodiment, the received communications traffic is wrapped in a plurality of OTN containers and the OTN containers are each transmitted as a series of traffic portions. Each OTN container commences transmission at a different optical path of the path sequence. The OTN containers are transmitted simultaneously.

In an embodiment, the spatially separate parts of the optical paths comprise one of physically distinct paths across the optical communication network, different optical fibre cables following a shared physical path across the optical communication network and different optical fibres within an optical fibre cable within the optical communication network.

In an embodiment, the optical communication network is a meshed network and the physically distinct paths are different paths across the meshed network.

In an embodiment, the optical communication network comprises a plurality of network parts, each network part being operated by a different network operator. The spatially separate parts of the optical paths are located in different network parts Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the physically distinct paths across the optical communication network may be paths across parts of the optical communication network operated by different network operators. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the communications traffic is transmitted as a series of traffic portions by transmitting the communications traffic on the respective optical channel of each optical path of the path sequence for a preselected transmission period.

In an embodiment, a part of an optical path may be shared if said part is in a location which is known to be secure.

In an embodiment, the path sequence is preselected and deterministic. This may mitigate transmission performance degradation since the source node and the target node know the path sequence and the source node can switch to the next path at the same time as the target node.

In an embodiment, the path sequence is a dynamic path sequence. This may further increase the security of transmission of the communications traffic.

In an embodiment, the communications traffic is packet traffic. In an embodiment, the communications traffic is internet protocol, IP, packet traffic.

In an embodiment, the communications traffic to be transmitted during each transmission period may be stored in a buffer for a period at least equal to a switching time for changing to the next optical path in the path sequence. The communications traffic has a data rate and the communication traffic is transmitted from the buffer at a higher data rate. This may enable continuous transmission of the communications traffic without loss of traffic, which may mitigate transmission performance degradation.

In an embodiment, the received communications traffic is stored in a buffer before being transmitted. The communications traffic is stored in the buffer for a period at least equal to a total switching time. This may enable the time required to switch the communications traffic onto each of the optical paths of the path sequence to be absorbed, which may mitigate transmission performance degradation.

In an embodiment, the communications traffic comprises a security marker if the communications traffic has a security level. The method comprises determining whether the communications traffic has a said security marker and only transmitting the communications traffic as a series of traffic portions if the communications traffic has a said security marker.

A second aspect of the invention provides a method of receiving communications traffic in an optical communication network comprising a plurality of nodes. The method comprises obtaining a path sequence. The path sequence defines an order in which a plurality of optical paths from a source node to the target node across the optical communication network are to be used. At least part of each optical path is spatially separate from each other optical path. The method comprises receiving a series of traffic portions at the target node. Each traffic portion is received for a respective preselected transmission period from a respective optical path according to the path sequence. The method comprises reconstructing the communications traffic from the received traffic portions according to the path sequence.

The method may ensure that even where a fibre tapping attack occurs, the attacker is not able to access the whole of the communications traffic being transmitted. The method may therefore provide a further line of defence against malicious eavesdropping and tapping of optical fibres. The method may also be used in conjunction with the prior art methods of protection implemented at higher network layers, specifically cryptography and steganography, because the action of switching transmission of the communications traffic onto different optical paths is transparent to the network transport layers where conventional security methods and protocols are provided. The method is similarly transparent to embedded optical time domain reflectometry, vibration monitoring systems, and optical network parameter monitoring and may be used in conjunction with these security systems also.

The method may enable a recipient of the communications traffic to benefit from a defence to a fibre tapping attack even when neither they nor the source of the communications traffic directly control the optical fibres across which the communications traffic is transmitted to them.

The method does not require radical changes in communication network equipment architectures and may therefore avoid the high implementation costs associated with prior art security systems, such as surveillance and monitoring systems. In an embodiment, each traffic portion is a portion of digitally wrapped communications traffic.

In an embodiment, the communications traffic is wrapped in a multi protocol label switching, MPLS, label switched path, LSP, and the MPLS LSP is transmitted as a series of traffic portions. The action of receiving LPSs among alternative paths for anti-tapping purposes has the same complexity as for failure recovery purposes.

In an embodiment, the received communications traffic is wrapped in a plurality of MPLS LSPs and the MPLS LSPs are each received as a series of traffic portions. Receipt of each MPLS LSP commences from a different optical path of the path sequence. The MPLS LSPs are received simultaneously.

In an embodiment, the communications traffic is wrapped in an optical transport network, OTN, container and the OTN container is transmitted as a series of traffic portions. In an embodiment, the OTN container is an optical data unit, ODU, such as ODU1, ODU2, etc.

In an embodiment, the received communications traffic is wrapped in a plurality of OTN containers and the OTN containers are each received as a series of traffic portions. Receipt of each OTN container commences from a different optical path of the path sequence. The OTN containers are received simultaneously.

In an embodiment, the communications traffic in each said traffic portion can only be reconstructed when recombined with at least one other said traffic portion. This means that one single traffic portion is never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker.

The amount of traffic in a traffic portion is set by setting the transmission period so that the amount of traffic is such that it can only be reconstructed when recombined with at least one other said traffic portion.

In an embodiment, the spatially separate parts of the optical paths comprise one of physically distinct paths across the optical communication network, different optical fibre cables following a shared physical path across the optical communication network and different optical fibres within an optical fibre cable within the optical communication network.

In an embodiment, the optical communication network is a meshed network and the physically distinct paths are different paths across the meshed network.

In an embodiment, the optical communication network comprises a plurality of network parts, each network part being operated by a different network operator. The spatially separate parts of the optical paths are located in different network parts Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the physically distinct paths across the optical communication network may be paths across parts of the optical communication network operated by different network operators. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the path sequence is preselected and deterministic. This may mitigate transmission performance degradation since the source node and the target node know the path sequence and the target node can switch to the next path at the same time as the source node.

In an embodiment, the path sequence is a dynamic path sequence. This may further increase the security of transmission of the communications traffic.

In an embodiment, the communications traffic is packet traffic. In an embodiment, the communications traffic is internet protocol, IP, packet traffic.

A third aspect of the invention provides a method of operating an optical communication network comprising a plurality of nodes. The method comprises configuring a plurality of optical paths from a source node to a target node across the optical communication network. At least part of each optical path is spatially separate from each other optical path. The method of operating an optical communication network comprises, at the source node, transmitting the communications traffic according to the following method of transmitting communications traffic in an optical communication network comprising a plurality of nodes. The method of transmitting communications traffic comprises receiving communications traffic at a source node, the communications traffic to be transmitted across the optical communication network to a target node. The method of transmitting communications traffic comprises, at the source node, obtaining a path sequence. The path sequence defines an order in which a plurality of optical paths from the source node to the target node across the optical communication network are to be used. At least part of each optical path is spatially separate from each other optical path. The method of transmitting communications traffic comprises, at the source node, transmitting the communications traffic as a series of traffic portions. Each traffic portion is transmitted for a respective preselected transmission period on a respective optical path according to the path sequence. The method of operating an optical communication network comprises, at the target node, receiving the communications traffic according to a method of receiving communications traffic in an optical communication network comprising a plurality of nodes. The method of receiving communications traffic comprises obtaining a path sequence. The path sequence defines an order in which a plurality of optical paths from a source node to the target node across the optical communication network are to be used. At least part of each optical path is spatially separate from each other optical path. The method of receiving communications traffic comprises receiving a series of traffic portions at the target node. Each traffic portion is received for a respective preselected transmission period from a respective optical path according to the path sequence. The method of receiving communications traffic comprises reconstructing the communications traffic from the received traffic portions according to the path sequence.

The method may ensure that even where a fibre tapping attack occurs, the attacker is not able to access the whole of the communications traffic being transmitted. The method may therefore provide a further line of defence against malicious eavesdropping and tapping of optical fibres. The method may also be used in conjunction with the prior art methods of protection implemented at higher network layers, specifically cryptography and steganography, because the action of switching transmission of the communications traffic onto different optical paths is transparent to the network transport layers where conventional security methods and protocols are provided. The method is similarly transparent to embedded optical time domain reflectometry, vibration monitoring systems, and optical network parameter monitoring and may be used in conjunction with these security systems also.

The method may enable the source of the communications traffic to implement a defence to a fibre tapping attack even when they do not directly control the optical fibres across which the communications traffic is to be transmitted.

The method does not require radical changes in communication network equipment architectures and may therefore avoid the high implementation costs associated with prior art security systems, such as surveillance and monitoring systems.

In an embodiment, the optical communication network is to be operated for communications traffic having a security level and the plurality of optical paths configured is proportional to the security level. This may enable a longer and more complex path sequence to be configured, which may enable the security of transmission of the communications traffic to be increase proportionally to the security level of the traffic.

In an embodiment, the communications traffic comprises a security marker if the communications traffic has a security level. The method comprises determining whether the communications traffic has a said security marker and only transmitting the communications traffic as a series of traffic portions if the communications traffic has a said security marker.

In an embodiment, the security marker comprises information identifying the security level. The method additionally comprises reading said information to obtain the security level.

In an embodiment, the path sequence is preselected and deterministic. This may mitigate transmission performance degradation since the source node and the target node know the path sequence and can switch to the next path at the correct time.

In an embodiment, the path sequence is a dynamic path sequence. This may further increase the security of transmission of the communications traffic.

In an embodiment, the dynamically changing path sequence is obtained by pseudo randomly generating a sequence of the optical paths. The method comprises securely communicating the path sequence to the source node and to the target node. This may further increase the complexity of the path sequence and may increase the security of transmission of the communications traffic.

In an embodiment, the communications traffic in each said traffic portion can only be reconstructed when recombined with at least one other said traffic portion. This means that one single traffic portion in never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker.

The amount of traffic in a traffic portion is set by setting the transmission period so that the amount of traffic is such that it can only be reconstructed when recombined with at least one other said traffic portion.

In an embodiment, the method comprises obtaining information identifying a respective different optical channel assigned to each said optical path and digitally wrapping the communications traffic. The digitally wrapped communications traffic is transmitted as a series of traffic portions, each traffic portion being transmitted on the optical channel assigned to its respective optical path. Switching the digitally wrapped traffic between different optical channels enables the switching to be implemented in the digital domain rather than at the optical layer. This may enable faster switching times to be achieved, which may mitigate any transmission performance degradation caused by the optical path hopping.

In an embodiment, the communications traffic is transmitted on a single optical channel. The optical channel is transmitted on each optical path of the path sequence for a respective preselected transmission period.

In an embodiment, the method comprises obtaining information identifying a respective different optical channel assigned to each said optical path and the communications traffic is digitally wrapped communications traffic. The digitally wrapped communications traffic is transmitted as a series of traffic portions, each traffic portion being transmitted on the optical channel assigned to its respective optical path. Switching the digitally wrapped traffic between different optical channels enables the switching to be implemented in the digital domain rather than at the optical layer. This may enable faster switching times to be achieved, which may mitigate any transmission performance degradation caused by the optical path hopping.

In an embodiment, the digitally wrapped traffic is transmitted on each optical channel for said transmission period.

In an embodiment, transmission of the digitally wrapped traffic is switched onto the optical channel of the next optical path in the path sequence on the elapsing of a timer.

In an embodiment, transmission of the digitally wrapped traffic is switched onto the optical channel of the next optical path in the path sequence in response to the detection of a false alarm signal. Detection of the false alarm signal initiates a switching mechanism arranged to switch transmission of the digitally wrapped traffic onto the optical channel of the next optical path in the path sequence. Using an existing switching mechanism within an optical communication network may offer the advantage of ease of implementation. No hardware protocols may need to be changed.

In an embodiment, the switching mechanism is a protection switching mechanism. The action of switching the traffic portions onto different optical paths for anti-tapping purposes may therefore have the same complexity as switching traffic for failure recovery purposes.

In an embodiment, the communications traffic is wrapped in a multi protocol label switching, MPLS, label switched path, LSP, and the MPLS LSP is transmitted as a series of traffic portions. The action of switching LPSs among alternative paths for anti-tapping purposes has the same complexity of switching LSP for failure recovery purposes.

In an embodiment, the communications traffic is wrapped in a plurality of MPLS LSPs and the MPLS LSPs are each transmitted as a series of traffic portions. Each MPLS LSP commences transmission at a different optical path of the path sequence. The MPLS LSPs are transmitted simultaneously.

In an embodiment, the communications traffic is wrapped in an optical transport network, OTN, container and the OTN container is transmitted as a series of traffic portions. In an embodiment, the OTN container is an optical data unit, ODU, such as ODU1, ODU2, etc.

In an embodiment, the communications traffic is wrapped in a plurality of OTN containers and the OTN containers are each transmitted as a series of traffic portions. Each OTN container commences transmission at a different optical path of the path sequence. The OTN containers are transmitted simultaneously.

In an embodiment, the spatially separate parts of the optical paths comprise one of physically distinct paths across the optical communication network, different optical fibre cables following a shared physical path across the optical communication network and different optical fibres within an optical fibre cable within the optical communication network.

In an embodiment, the optical communication network is a meshed network and the physically distinct paths are different paths across the meshed network.

In an embodiment, the optical communication network comprises a plurality of network parts, each network part being operated by a different network operator. The spatially separate parts of the optical paths are located in different network parts Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the physically distinct paths across the optical communication network may be paths across parts of the optical communication network operated by different network operators. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the communications traffic is transmitted as a series of traffic portions by transmitting the communications traffic on the respective optical channel of each optical path of the path sequence for a preselected transmission period.

In an embodiment, a part of an optical path may be shared if said part is in a location which is known to be secure.

In an embodiment, the path sequence is preselected and deterministic. This may mitigate transmission performance degradation since the source node and the target node know the path sequence and can switch to the next path at the correct time.

In an embodiment, the path sequence is a dynamic path sequence. This may further increase the security of transmission of the communications traffic.

In an embodiment, the communications traffic is packet traffic. In an embodiment, the communications traffic is internet protocol, IP, packet traffic.

In an embodiment, the communications traffic to be transmitted during each transmission period may be stored in a buffer for a period at least equal to a switching time for changing to the next optical path in the path sequence. The communications traffic has a data rate and the communication traffic is transmitted from the buffer at a higher data rate. This may enable continuous transmission of the communications traffic without loss of traffic, which may mitigate transmission performance degradation.

In an embodiment, the communications traffic is stored in a buffer before being transmitted. The communications traffic is stored in the buffer for a period at least equal to a total switching time. This may enable the time required to switch the communications traffic onto each of the optical paths of the path sequence to be absorbed, which may mitigate transmission performance degradation.

In an embodiment, the communications traffic comprises a security marker if the communications traffic has a security level. The method comprises determining whether the communications traffic has a said security marker and only transmitting the communications traffic as a series of traffic portions if the communications traffic has a said security marker.

A fourth aspect of the invention provides an optical communication network transmitter module comprising an input, a plurality of outputs, an optical transmitter and a module controller. The input is arranged to receive communications traffic to be transmitted. Each of the outputs is arranged to be coupled to a respective one of a plurality of optical paths across an optical communication network. The module controller is arranged to obtain a path sequence defining an order in which a plurality of optical paths from the transmitter module to a target node across the optical communication network are to be used. At least part of each optical path is spatially separate from each other optical path. The module controller is additionally arranged to generate and transmit at least one transmitter control signal containing instructions arranged to cause the optical transmitter to transmit the communications traffic as a series of traffic portions. The instructions are arranged to cause each traffic portion to be transmitted for a respective preselected transmission period on a respective optical path according to the path sequence.

The transmitter module may be used to ensure that even where a fibre tapping attack occurs, the attacker is not able to access the whole of the communications traffic being transmitted. The transmitter module may provide a further line of defence against malicious eavesdropping and tapping of optical fibres. The transmitter module may also be used in conjunction with the prior art methods of protection implemented at higher network layers, specifically cryptography and steganography, because the action of switching transmission of the communications traffic onto different optical paths is transparent to the network transport layers where conventional security methods and protocols are provided. The transmitter module is similarly transparent to embedded optical time domain reflectometry, vibration monitoring systems, and optical network parameter monitoring and may be used in conjunction with these security systems also.

The transmitter module may be used to implement a defence to a fibre tapping attack even when the owner of the transmitter module does not directly control the optical fibres across which the communications traffic is to be transmitted.

The transmitter module does not require radical changes in communication network equipment architectures and may therefore avoid the high implementation costs associated with prior art security systems, such as surveillance and monitoring systems.

In an embodiment, the optical communication network transmitter module comprises a plurality of optical transmitters and a digital wrapping element. Each optical transmitter is arranged to operate at a different one of a plurality of optical channels and is coupled to a respective one of the optical outputs. The digital wrapping element is arranged to digitally wrap the communications traffic. The at least one transmitter control signal contains instructions arranged to cause the optical transmitters to transmit the digitally wrapped communications traffic as a series of traffic portions. The instructions are arranged to cause each traffic portion to be transmitted for a respective preselected transmission period by a respective optical transmitter according to the path sequence.

Switching the digitally wrapped traffic between different optical channels enables the transmitter module to implement the switching in the digital domain rather than at the optical layer. This may enable faster switching times to be achieved, which may mitigate any transmission performance degradation caused by the optical path hopping.

In an embodiment, the module controller is arranged to obtain information identifying a respective different optical channel assigned to each said optical path.

In an embodiment, the communications traffic in each said traffic portion is only able to be reconstructed when recombined with at least one other said traffic portion. This means that one single traffic portion is never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker.

The amount of traffic in a traffic portion is set by setting the transmission period so that the amount of traffic is such that it can only be reconstructed when recombined with at least one other said traffic portion.

In an embodiment, the module controller is arranged to switch transmission of the digitally wrapped traffic onto the optical channel of the next optical path in the path sequence on the elapsing of a timer.

In an embodiment, the module controller is configured with a switching mechanism. The module controller is arranged to switch transmission of the digitally wrapped traffic onto the optical channel of the next optical path in the path sequence by implementing the switching mechanism in response to detecting a false alarm signal. Using an existing switching mechanism may offer the advantage of ease of implementation. No hardware protocols may need to be changed.

In an embodiment, the switching mechanism is a protection switching mechanism. The action of switching the traffic portions onto different optical paths for anti-tapping purposes may therefore have the same complexity as switching traffic for failure recovery purposes.

In an embodiment, the digital wrapping element is arranged to wrap the communications traffic in a multi protocol label switching, MPLS, label switched path, LSP. The transmitter control signal contains instructions arranged to cause the optical transmitters to transmit the MPLS LSP as a series of traffic portions. The action of switching LPSs among alternative paths for anti-tapping purposes has the same complexity of switching LSP for failure recovery purposes.

In an embodiment, the digital wrapping element is arranged to wrap the communications traffic in an optical transport network, OTN, container. The transmitter control signal contains instructions arranged to cause the optical transmitters to transmit the optical transport network container as a series of traffic portions. In an embodiment, the OTN container is an optical data unit, ODU, such as ODU1, ODU2, etc.

In an embodiment, the digital wrapping element is arranged to wrap the communications traffic in a plurality of MPLS LSPs. The transmitter control signal contains instructions arranged to cause the optical transmitters to transmit each MPLS LSP as a series of traffic portions. The transmitter control signal contains instructions arranged to cause transmission of each MPLS LSP to commence at a different optical path of the path sequence. The MPLS LSPs are transmitted simultaneously.

In an embodiment, the digital wrapping element is arranged to wrap the communications traffic in a plurality of OTN containers. The transmitter control signal contains instructions arranged to cause the optical transmitters to transmit each OTN container as a series of traffic portions. The transmitter control signal contains instructions arranged to cause transmission of each OTN container to commence at a different optical path of the path sequence. The transmitter control signal contains instructions arranged to cause the OTN containers to be transmitted simultaneously.

In an embodiment, the digital wrapping element is an IP/MPLS switch.

In an embodiment, the spatially separate parts of the optical paths comprise one of physically distinct paths across the optical communication network, different optical fibre cables following a shared physical path across the optical communication network and different optical fibres within an optical fibre cable within the optical communication network.

In an embodiment, the optical communication network is a meshed network and the physically distinct paths are different paths across the meshed network.

In an embodiment, the optical communication network comprises a plurality of network parts, each network part being operated by a different network operator. The spatially separate parts of the optical paths are located in different network parts. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the physically distinct paths across the optical communication network may be paths across parts of the optical communication network operated by different network operators. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, a part of an optical path may be shared if said part is in a location which is known to be secure.

In an embodiment, the path sequence is preselected and deterministic. This may mitigate transmission performance degradation since the transmitter module and the target node may both know the path sequence and the transmitter module can switch to the next path at the same time as the target node.

In an embodiment, the path sequence is a dynamic path sequence. This may further increase the security of transmission of the communications traffic.

In an embodiment, the communications traffic is packet traffic. In an embodiment, the communications traffic is internet protocol, IP, packet traffic.

In an embodiment, the transmitter module further comprises a buffer. The communications traffic to be transmitted during each transmission period is stored in the buffer for a period at least equal to a switching time for changing to the next optical path in the path sequence. The communications traffic has a data rate and the module controller is arranged to transmit the communication traffic from the buffer at a higher data rate. This may enable continuous transmission of the communications traffic without loss of traffic, which may mitigate transmission performance degradation.

In an embodiment, the transmitter module further comprises a buffer. The received communications traffic is stored in the buffer before being transmitted. The communications traffic is stored in the buffer for a period at least equal to a total switching time. This may absorb the time required to switch the communications traffic onto each of the optical paths of the path sequence, which may mitigate transmission performance degradation.

In an embodiment, the communications traffic comprises a security marker if the communications traffic has a security level. The module controller is additionally arranged to determine whether the communications traffic has a said security marker and the module controller is arranged to transmit the communications traffic as a series of traffic portions if the communications traffic has a said security marker.

A fifth aspect of the invention provides an optical communication network receiver module comprising a plurality of inputs, a plurality of optical receivers, and a module controller. Each input is arranged to be coupled to a respective one of a plurality of optical paths across an optical communication network from a source node to the receiver module. At least part of each optical path is spatially separate from each other optical path. Each optical receiver is coupled to a respective one of the inputs. The module controller is arranged to obtain a path sequence defining an order in which the plurality of optical paths across the optical communication network are to be used. The module controller is additionally arranged to receive a series of traffic portions. Each traffic portion is received for a respective preselected transmission period. The module controller is additionally arranged to reconstruct the communications traffic from the received traffic portions according to the path sequence.

The receiver module may be used to receive communications traffic which even if it has suffered a fibre tapping attack, the attacker is not able to access the whole of the communications traffic received at the receiver module. The receiver module may also be used in conjunction with the prior art methods of protection implemented at higher network layers, specifically cryptography and steganography, because the action of switching transmission of the communications traffic onto different optical paths is transparent to the network transport layers where conventional security methods and protocols are provided.

The receiver module may enable a recipient of the communications traffic to benefit from a defence to a fibre tapping attack even when neither they nor the source of the communications traffic directly control the optical fibres across which the communications traffic is transmitted to them.

The receiver module does not require radical changes in communication network equipment architectures and may therefore avoid the high implementation costs associated with prior art security systems, such as surveillance and monitoring systems.

In an embodiment, each traffic portion is a portion of digitally wrapped communications traffic.

In an embodiment, each traffic portion is a portion of a multi protocol label switching, MPLS, label switched path, LSP. Receiving LPSs among alternative paths for anti-tapping purposes has the same complexity as for failure recovery purposes.

In an embodiment, the module controller is arranged to simultaneously receive a plurality of traffic portions, each being a portion of a different LSP.

In an embodiment, each traffic portion is a portion of an optical transport network, OTN. In an embodiment, the OTN container is an optical data unit, ODU, such as ODU1, ODU2, etc.

In an embodiment, the module controller is arranged to simultaneously receive a plurality of traffic portions, each being a portion of a different OTN container.

In an embodiment, the communications traffic in each said traffic portion is only able to be reconstructed when recombined with at least one other said traffic portion. This means that one single traffic portion is never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker.

The amount of traffic in a traffic portion is set by setting the transmission period so that the amount of traffic is such that it can only be reconstructed when recombined with at least one other said traffic portion. This means that one single traffic portion in never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker.

In an embodiment, the spatially separate parts of the optical paths comprise one of physically distinct paths across the optical communication network, different optical fibre cables following a shared physical path across the optical communication network and different optical fibres within an optical fibre cable within the optical communication network.

In an embodiment, the optical communication network is a meshed network and the physically distinct paths are different paths across the meshed network.

In an embodiment, the optical communication network comprises a plurality of network parts, each network part being operated by a different network operator. The spatially separate parts of the optical paths are located in different network parts Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the physically distinct paths across the optical communication network may be paths across parts of the optical communication network operated by different network operators. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the path sequence is preselected and deterministic. This may mitigate transmission performance degradation since the receiver module and the source node may both know the path sequence and the receiver module can switch to the next path at the same time as the source node.

In an embodiment, the path sequence is a dynamic path sequence. This may further increase the security of transmission of the communications traffic. In an embodiment, the communications traffic is packet traffic. In an embodiment, the communications traffic is internet protocol, IP, packet traffic.

A sixth aspect of the invention provides an optical communication network node comprising at least one of a communication network transmitter module and a communication network receiver module. The optical communication network transmitter module comprises an input, a plurality of outputs, an optical transmitter and a module controller. The input is arranged to receive communications traffic to be transmitted. Each of the outputs is arranged to be coupled to a respective one of a plurality of optical paths across an optical communication network. The module controller is arranged to obtain a path sequence defining an order in which a plurality of optical paths from the transmitter module to a target node across the optical communication network are to be used. At least part of each optical path is spatially separate from each other optical path. The module controller is additionally arranged to generate and transmit at least one transmitter control signal containing instructions arranged to cause the optical transmitter to transmit the communications traffic as a series of traffic portions. The instructions are arranged to cause each traffic portion to be transmitted for a respective preselected transmission period on a respective optical path according to the path sequence. The optical communication network receiver module comprises a plurality of inputs, a plurality of optical receivers, and a module controller. Each input is arranged to be coupled to a respective one of a plurality of optical paths across an optical communication network from a source node to the receiver module. At least part of each optical path is spatially separate from each other optical path. Each optical receiver is coupled to a respective one of the inputs. The module controller is arranged to obtain a path sequence defining an order in which the plurality of optical paths across the optical communication network are to be used. The module controller is additionally arranged to receive a series of traffic portions. Each traffic portion is received for a respective preselected transmission period on a respective optical channel from a respective optical path according to the path sequence. The module controller is additionally arranged to reconstruct the communications traffic from the received traffic portions according to the path sequence.

The node may be used to ensure that even where a fibre tapping attack occurs, the attacker is not able to access the whole of the communications traffic being transmitted or received. The node may provide a further line of defence against malicious eavesdropping and tapping of optical fibres. The transmitter module may also be used in conjunction with the prior art methods of protection implemented at higher network layers, specifically cryptography and steganography, because the action of switching transmission of the communications traffic onto different optical paths is transparent to the network transport layers where conventional security methods and protocols are provided. The node is similarly transparent to embedded optical time domain reflectometry, vibration monitoring systems, and optical network parameter monitoring and may be used in conjunction with these security systems also.

The node may be used to implement a defence to a fibre tapping attack even when the owner of the transmitter module does not directly control the optical fibres across which the communications traffic is to be transmitted.

The node does not require radical changes in communication network equipment architectures and may therefore avoid the high implementation costs associated with prior art security systems, such as surveillance and monitoring systems. In an embodiment, the optical communication network transmitter module comprises a plurality of optical transmitters and a digital wrapping element. Each optical transmitter is arranged to operate at a different one of a plurality of optical channels and is coupled to a respective one of the optical outputs. The digital wrapping element is arranged to digitally wrap the communications traffic. The at least one transmitter control signal contains instructions arranged to cause the optical transmitters to transmit the digitally wrapped communications traffic as a series of traffic portions. The instructions are arranged to cause each traffic portion to be transmitted for a respective preselected transmission period by a respective optical transmitter according to the path sequence.

In an embodiment, the optical communication network transmitter module comprises a plurality of optical transmitters and a digital wrapping element. Each optical transmitter is arranged to operate at a different one of a plurality of optical channels and is coupled to a respective one of the optical outputs. The digital wrapping element is arranged to digitally wrap the communications traffic. The at least one transmitter control signal contains instructions arranged to cause the optical transmitters to transmit the digitally wrapped communications traffic as a series of traffic portions. The instructions are arranged to cause each traffic portion to be transmitted for a respective preselected transmission period by a respective optical transmitter according to the path sequence.

Switching digitally wrapped traffic between different optical channels enables the transmitter module to implement the switching in the digital domain rather than at the optical layer. This may enable faster switching times to be achieved, which may mitigate any transmission performance degradation caused by the optical path hopping.

In an embodiment, the transmitter module controller is arranged to obtain information identifying a respective different optical channel assigned to each said optical path.

In an embodiment, the communications traffic in each said traffic portion is only able to be reconstructed when recombined with at least one other said traffic portion. This means that one single traffic portion is never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker.

The amount of traffic in a traffic portion is set by setting the transmission period so that the amount of traffic is such that it can only be reconstructed when recombined with at least one other said traffic portion.

In an embodiment, the transmitter module controller is arranged to switch transmission of the digitally wrapped traffic onto the optical channel of the next optical path in the path sequence on the elapsing of a timer.

In an embodiment, the transmitter module controller is configured with a switching mechanism. The transmitter module controller is arranged to switch transmission of the digitally wrapped traffic onto the optical channel of the next optical path in the path sequence by implementing the switching mechanism in response to detecting a false alarm signal. Using an existing switching mechanism may offer the advantage of ease of implementation. No hardware protocols may need to be changed.

In an embodiment, the switching mechanism is a protection switching mechanism. The action of switching the traffic portions onto different optical paths for anti-tapping purposes may therefore have the same complexity as switching traffic for failure recovery purposes.

In an embodiment, the digital wrapping element is arranged to wrap the communications traffic in a multi protocol label switching, MPLS, label switched path, LSP. The transmitter control signal contains instructions arranged to cause the optical transmitters to transmit the MPLS LSP as a series of traffic portions. The action of switching LPSs among alternative paths for anti-tapping purposes has the same complexity of switching LSP for failure recovery purposes.

In an embodiment, the digital wrapping element is arranged to wrap the communications traffic in an optical transport network, OTN, container. The transmitter control signal contains instructions arranged to cause the optical transmitters to transmit the optical transport network container as a series of traffic portions. In an embodiment, the OTN container is an optical data unit, ODU, such as ODU1, ODU2, etc.

In an embodiment, the digital wrapping element is arranged to wrap the received communications traffic is wrapped in a plurality of MPLS LSPs. The transmitter control signal contains instructions arranged to cause the optical transmitters to transmit each MPLS LSP as a series of traffic portions. The transmitter control signal contains instructions arranged to cause transmission of each MPLS LSP to commence at a different optical path of the path sequence. The MPLS LSPs are transmitted simultaneously.

In an embodiment, the digital wrapping element is arranged to wrap the communications traffic in a plurality of OTN containers. The transmitter control signal contains instructions arranged to cause the optical transmitters to transmit each OTN container as a series of traffic portions. The transmitter control signal contains instructions arranged to cause transmission of each OTN container to commence at a different optical path of the path sequence. The transmitter control signal contains instructions arranged to cause the OTN containers to be transmitted simultaneously.

In an embodiment, the digital wrapping element is an IP/MPLS switch.

In an embodiment, the spatially separate parts of the optical paths comprise one of physically distinct paths across the optical communication network, different optical fibre cables following a shared physical path across the optical communication network and different optical fibres within an optical fibre cable within the optical communication network.

In an embodiment, the optical communication network is a meshed network and the physically distinct paths are different paths across the meshed network.

In an embodiment, the optical communication network comprises a plurality of network parts, each network part being operated by a different network operator. The spatially separate parts of the optical paths are located in different network parts. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the physically distinct paths across the optical communication network may be paths across parts of the optical communication network operated by different network operators. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, a part of an optical path may be shared if said part is in a location which is known to be secure.

In an embodiment, the path sequence is preselected and deterministic. This may mitigate transmission performance degradation since the transmitter module and the target node may both know the path sequence and the transmitter module can switch to the next path at the same time as the target node.

In an embodiment, the path sequence is a dynamic path sequence. This may further increase the security of transmission of the communications traffic.

In an embodiment, the communications traffic is packet traffic. In an embodiment, the communications traffic is internet protocol, IP, packet traffic.

In an embodiment, the transmitter module further comprises a buffer. The communications traffic to be transmitted during each transmission period is stored in the buffer for a period at least equal to a switching time for changing to the next optical path in the path sequence. The communications traffic has a data rate and the module controller is arranged to transmit the communication traffic from the buffer at a higher data rate. This may enable continuous transmission of the communications traffic without loss of traffic, which may mitigate transmission performance degradation.

In an embodiment, the transmitter module further comprises a buffer. The received communications traffic is stored in the buffer before being transmitted. The communications traffic is stored in the buffer for a period at least equal to a total switching time. This may absorb the time required to switch the communications traffic onto each of the optical paths of the path sequence, which may mitigate transmission performance degradation.

In an embodiment, the communications traffic comprises a security marker if the communications traffic has a security level. The transmitter module controller is additionally arranged to determine whether the communications traffic has a said security marker and the module controller is arranged to transmit the communications traffic as a series of traffic portions if the communications traffic has a said security marker.

In an embodiment, each traffic portion received at the receiver module is a portion of digitally wrapped communications traffic.

In an embodiment, each traffic portion received at the receiver module is a portion of a multi protocol label switching, MPLS, label switched path, LSP. Receiving LPSs among alternative paths for anti-tapping purposes has the same complexity as for failure recovery purposes.

In an embodiment, the receiver module controller is arranged to simultaneously receive a plurality of traffic portions, each being a portion of a different LSP.

In an embodiment, each traffic portion received at the receiver module is a portion of an optical transport network, OTN. In an embodiment, the OTN container is an optical data unit, ODU, such as ODU1, ODU2, etc.

In an embodiment, the receiver module controller is arranged to simultaneously receive a plurality of traffic portions, each being a portion of a different OTN container.

A seventh aspect of the invention provides an optical communication network comprising a source node, a target node, a plurality of intermediate nodes, a plurality of optical fibre links each connecting a pair of the nodes, and a network control element. The source node comprises an optical communication network transmitter module comprising an input, a plurality of outputs, an optical transmitter and a module controller. The input is arranged to receive communications traffic to be transmitted. Each of the outputs is arranged to be coupled to a respective one of a plurality of optical paths across an optical communication network. The module controller is arranged to obtain a path sequence defining an order in which a plurality of optical paths from the transmitter module to a target node across the optical communication network are to be used. At least part of each optical path is spatially separate from each other optical path. The module controller is additionally arranged to generate and transmit at least one transmitter control signal containing instructions arranged to cause the optical transmitter to transmit the communications traffic as a series of traffic portions. The instructions are arranged to cause each traffic portion to be transmitted for a respective preselected transmission period on a respective optical path according to the path sequence. The target node comprises an optical communication network receiver module comprising a plurality of inputs, a plurality of optical receivers, and a module controller. Each input is arranged to be coupled to a respective one of a plurality of optical paths across an optical communication network from a source node to the receiver module. At least part of each optical path is spatially separate from each other optical path. Each optical receiver is coupled to a respective one of the inputs. The module controller is arranged to obtain a path sequence defining an order in which the plurality of optical paths across the optical communication network are to be used. The module controller is additionally arranged to receive a series of traffic portions. Each traffic portion is received for a respective preselected transmission period on a respective optical channel from a respective optical path according to the path sequence. The module controller is additionally arranged to reconstruct the communications traffic from the received traffic portions according to the path sequence. The network control element is arranged to configure a plurality of optical paths from the source node to the target node across the optical communication network. At least part of each optical path is spatially separate from each other optical path. The network control element is additionally arranged to generate a path sequence defining an order in which the optical paths are to be used.

The network may be used to ensure that even where a fibre tapping attack occurs, the attacker is not able to access the whole of the communications traffic being transmitted or received. The network may provide a further line of defence against malicious eavesdropping and tapping of optical fibres. The network may be used to ensure that even where a fibre tapping attack occurs, the attacker is not able to access the whole of the communications traffic being transmitted or received. The network may provide a further line of defence against malicious eavesdropping and tapping of optical fibres. The network may also be used in conjunction with the prior art methods of protection implemented at higher network layers, specifically cryptography and steganography, because the action of switching transmission of the communications traffic onto different optical paths is transparent to the network transport layers where conventional security methods and protocols are provided. The network is similarly transparent to embedded optical time domain reflectometry, vibration monitoring systems, and optical network parameter monitoring and may be used in conjunction with these security systems also.

The network does not require radical changes in communication network equipment architectures and may therefore avoid the high implementation costs associated with prior art security systems, such as surveillance and monitoring systems. may also be used in conjunction with the prior art methods of protection implemented at higher network layers, specifically cryptography and steganography, because the action of switching transmission of the communications traffic onto different optical paths is transparent to the network transport layers where conventional security methods and protocols are provided. The network is similarly transparent to embedded optical time domain reflectometry, vibration monitoring systems, and optical network parameter monitoring and may be used in conjunction with these security systems also.

In an embodiment, the optical communication network transmitter module comprises a plurality of optical transmitters and a digital wrapping element. Each optical transmitter is arranged to operate at a different one of a plurality of optical channels and is coupled to a respective one of the optical outputs. The digital wrapping element is arranged to digitally wrap the communications traffic. The at least one transmitter control signal contains instructions arranged to cause the optical transmitters to transmit the digitally wrapped communications traffic as a series of traffic portions. The instructions are arranged to cause each traffic portion to be transmitted for a respective preselected transmission period by a respective optical transmitter according to the path sequence.

Switching digitally wrapped traffic between different optical channels enables the transmitter module to implement the switching in the digital domain rather than at the optical layer. This may enable faster switching times to be achieved, which may mitigate any transmission performance degradation caused by the optical path hopping.

In an embodiment, the transmitter module controller is arranged to obtain information identifying a respective different optical channel assigned to each said optical path.

In an embodiment, the communications traffic in each said traffic portion is only able to be reconstructed when recombined with at least one other said traffic portion. This means that one single traffic portion is never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker.

The amount of traffic in a traffic portion is set by setting the transmission period so that the amount of traffic is such that it can only be reconstructed when recombined with at least one other said traffic portion.

In an embodiment, the transmitter module controller is arranged to switch transmission of the digitally wrapped traffic onto the optical channel of the next optical path in the path sequence on the elapsing of a timer.

In an embodiment, the transmitter module controller is configured with a switching mechanism. The transmitter module controller is arranged to switch transmission of the digitally wrapped traffic onto the optical channel of the next optical path in the path sequence by implementing the switching mechanism in response to detecting a false alarm signal. Using an existing switching mechanism may offer the advantage of ease of implementation. No hardware protocols may need to be changed.

In an embodiment, the switching mechanism is a protection switching mechanism. The action of switching the traffic portions onto different optical paths for anti-tapping purposes may therefore have the same complexity as switching traffic for failure recovery purposes.

In an embodiment, the digital wrapping element is arranged to wrap the communications traffic in a multi protocol label switching, MPLS, label switched path, LSP. The transmitter control signal contains instructions arranged to cause the optical transmitters to transmit the MPLS LSP as a series of traffic portions. The action of switching LPSs among alternative paths for anti-tapping purposes has the same complexity of switching LSP for failure recovery purposes.

In an embodiment, the digital wrapping element is arranged to wrap the communications traffic in an optical transport network, OTN, container. The transmitter control signal contains instructions arranged to cause the optical transmitters to transmit the optical transport network container as a series of traffic portions. In an embodiment, the OTN container is an optical data unit, ODU, such as ODU1, ODU2, etc.

In an embodiment, the digital wrapping element is arranged to wrap the received communications traffic is wrapped in a plurality of MPLS LSPs. The transmitter control signal contains instructions arranged to cause the optical transmitters to transmit each MPLS LSP as a series of traffic portions. The transmitter control signal contains instructions arranged to cause transmission of each MPLS LSP to commence at a different optical path of the path sequence. The MPLS LSPs are transmitted simultaneously.

In an embodiment, the digital wrapping element is arranged to wrap the communications traffic in a plurality of OTN containers. The transmitter control signal contains instructions arranged to cause the optical transmitters to transmit each OTN container as a series of traffic portions. The transmitter control signal contains instructions arranged to cause transmission of each OTN container to commence at a different optical path of the path sequence. The transmitter control signal contains instructions arranged to cause the OTN containers to be transmitted simultaneously.

In an embodiment, the digital wrapping element is an IP/MPLS switch.

In an embodiment, the transmitter module further comprises a buffer. The communications traffic to be transmitted during each transmission period is stored in the buffer for a period at least equal to a switching time for changing to the next optical path in the path sequence. The communications traffic has a data rate and the module controller is arranged to transmit the communication traffic from the buffer at a higher data rate. This may enable continuous transmission of the communications traffic without loss of traffic, which may mitigate transmission performance degradation.

In an embodiment, the transmitter module further comprises a buffer. The received communications traffic is stored in the buffer before being transmitted. The communications traffic is stored in the buffer for a period at least equal to a total switching time. This may absorb the time required to switch the communications traffic onto each of the optical paths of the path sequence, which may mitigate transmission performance degradation.

In an embodiment, the communications traffic comprises a security marker if the communications traffic has a security level. The transmitter module controller is additionally arranged to determine whether the communications traffic has a said security marker and the module controller is arranged to transmit the communications traffic as a series of traffic portions if the communications traffic has a said security marker.

In an embodiment, each traffic portion received at the receiver module is a portion of digitally wrapped communications traffic.

In an embodiment, each traffic portion received at the receiver module is a portion of a multi protocol label switching, MPLS, label switched path, LSP. Receiving LPSs among alternative paths for anti-tapping purposes has the same complexity as for failure recovery purposes.

In an embodiment, the receiver module controller is arranged to simultaneously receive a plurality of traffic portions, each being a portion of a different LSP.

In an embodiment, each traffic portion received at the receiver module is a portion of an optical transport network, OTN. In an embodiment, the OTN container is an optical data unit, ODU, such as ODU1, ODU2, etc.

In an embodiment, the receiver module controller is arranged to simultaneously receive a plurality of traffic portions, each being a portion of a different OTN container.

In an embodiment, the network control element is arranged to configure the optical paths such that the spatially separate parts of the optical paths comprise one of physically distinct paths across the optical communication network, different optical fibres following a shared physical path across the optical communication network and different optical fibres within an optical fibre cable within the optical communication network.

In an embodiment, the optical communication network is a meshed network and the physically distinct paths are different paths across the meshed network.

In an embodiment, the optical communication network comprises a plurality of network parts, each network part being operated by a different network operator. The network control element is arranged to configure the optical paths so that the spatially separate parts are located in different network parts. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, the network control element is arranged to configure the optical paths so that the physically distinct paths across the optical communication network are paths across parts of the optical communication network operated by different network operators. Using paths across network parts operated by different network operators may further increase the security of transmission across the network. By hopping among optical paths crossing networks operated by, for example, two different operators, the risks cause where one of the operators less stringently monitors for fibre tapping attacks or has easier access to its fibre infrastructure may be reduced.

In an embodiment, a part of an optical path may be shared if said part is in a location which is known to be secure.

In an embodiment, the communications traffic is packet traffic. In an embodiment, the communications traffic is internet protocol, IP, packet traffic.

In an embodiment, the communications traffic has a security level. The network control element is arranged to configure a plurality of optical paths proportional to the security level. This may enable a longer and more complex path sequence to be configured, which may enable the security of transmission of the communications traffic to be increase proportionally to the security level of the traffic.

In an embodiment, the network control element is arranged to generate a preselected and deterministic path sequence. The network control element is further arranged to generate and transmit a path sequence signal to the first node and to the second node. This may mitigate transmission performance degradation since the transmitter module and the target node may both know the path sequence and the transmitter module can switch to the next path at the same time as the target node.

In an embodiment, the network control element is arranged to generate a dynamically changing path sequence by pseudo randomly generating a sequence of the optical paths. The network control element is further arranged to generate and transmit a path sequence signal to the first node and to the second node. This may further increase the security of transmission of the communications traffic.

In an embodiment, the network comprises a network management system and the network control element is within the network management system.

In an embodiment, the network management system comprises a path computation engine and the network control element is within the path computation engine.

An eighth aspect of the invention provides a data carrier having computer readable instructions embodied therein. The computer readable instructions are for providing access to resources available on a processor and the computer readable instructions comprise instructions to cause the processor to perform any of the steps of the above method of transmitting communications traffic in an optical communication network comprising a plurality of nodes.

A ninth aspect of the invention provides a data carrier having computer readable instructions embodied therein. The computer readable instructions are for providing access to resources available on a processor and the computer readable instructions comprise instructions to cause the processor to perform any of the steps of the above method of receiving communications traffic in an optical communication network comprising a plurality of nodes.

A tenth aspect of the invention provides a data carrier having computer readable instructions embodied therein. The computer readable instructions are for providing access to resources available on a processor and the computer readable instructions comprise instructions to cause the processor to perform any of the steps of the above method of operating an optical communication network comprising a plurality of nodes.

In an embodiment, the data carrier is a non-transitory data carrier.

Embodiments of the invention will now be described, by way of example only, with reference to the accompanying drawings.

DETAILED DESCRIPTION

Figure 1:
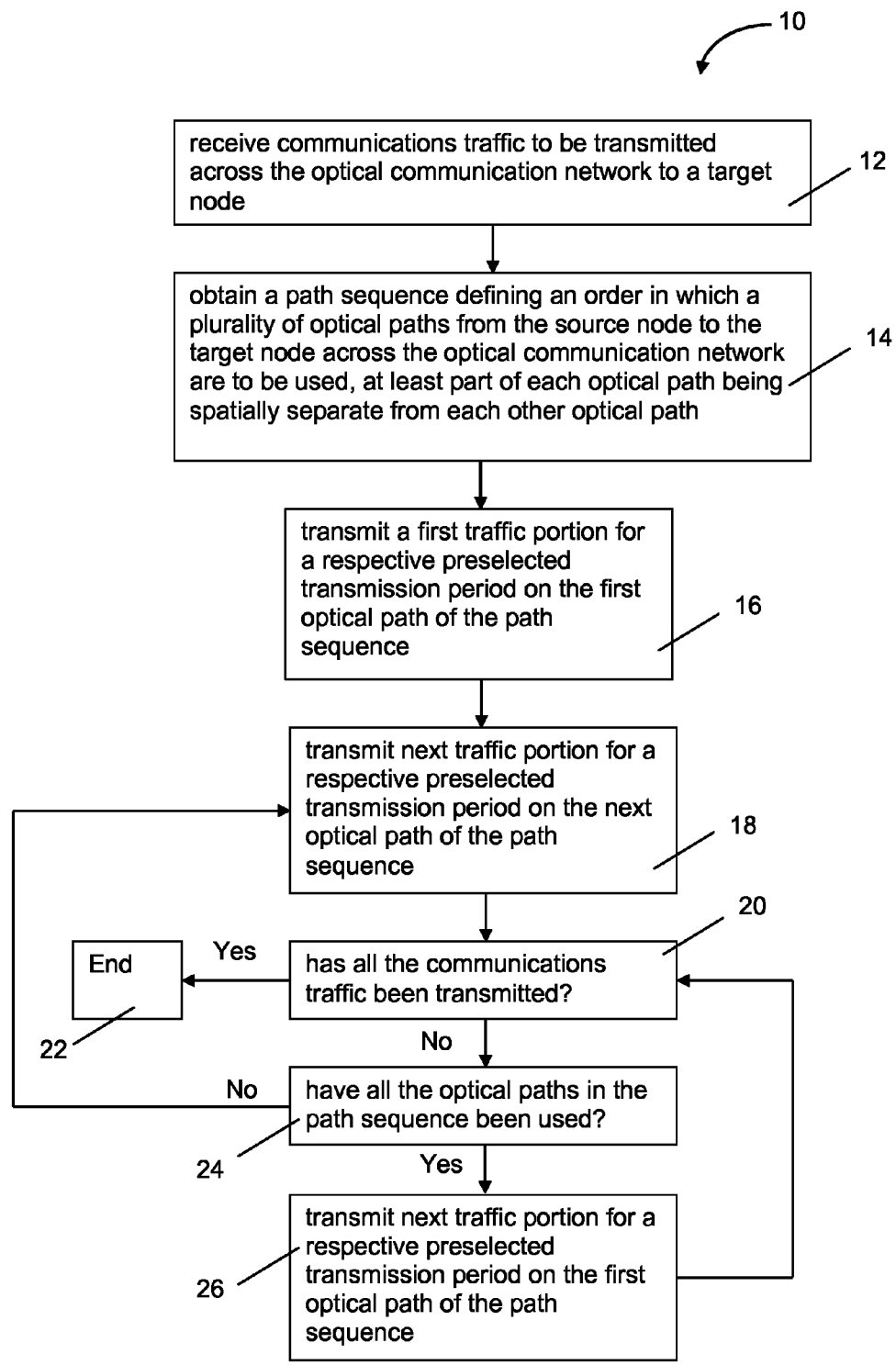
FIG. 1 shows the steps of a method according to a first embodiment of the invention of transmitting communications traffic in an optical communication network comprising a plurality of nodes.

Referring to FIG. 1, a first embodiment of the invention provides a method 10 of transmitting communications traffic in an optical communication network comprising a plurality of nodes. The method 10 comprises, at a source node within an optical communication network, receiving communications traffic to be transmitted across the network to a target node 12. The target node is a different node to the source node and is located remote from the source node within the network.

The method 10 comprises obtaining a path sequence which defines an order in which a plurality of optical paths from the source node to the target node across the optical communication network are to be used 14. At least part of each optical path is spatially separate from each other optical path.

The method 10 comprises transmitting the communications traffic as a series of traffic portions. Each traffic portion is transmitted for a respective preselected transmission period on a respective optical path according to the path sequence. A first traffic portion is transmitted on the first optical path of the path sequence 16. The next traffic portion is transmitted on the next optical path of the path sequence 18. If all of the communications traffic has been transmitted, the method ends 22. If there is traffic still to be transmitted, the method 10 continues to transmitting the next traffic portion on the next optical path of the path sequence 18, and so on. If all of the optical paths in the path sequence have been used 24, the method returns to the first optical path in the path sequence 26 and so on, following the path sequence until the last traffic portion has been transmitted.

As will be well known by the person skilled in the art, in an optical network communications traffic is transmitted on an optical channel, also known as a 'lightpath', which has a respective wavelength. Typically, traffic is transmitted on a plurality of optical channels, each of which has a different wavelength. In this embodiment, the communications traffic can be transmitted in one of two different ways, as follows. A single optical channel can be used to transmit all of the traffic, with the optical channel being switched onto a respective optical path for each traffic portion. Alternatively, as will be described in more detail below, the traffic portions can be switched onto different optical channels, with each optical channel being transmitted on a different optical path.

Figure 2:
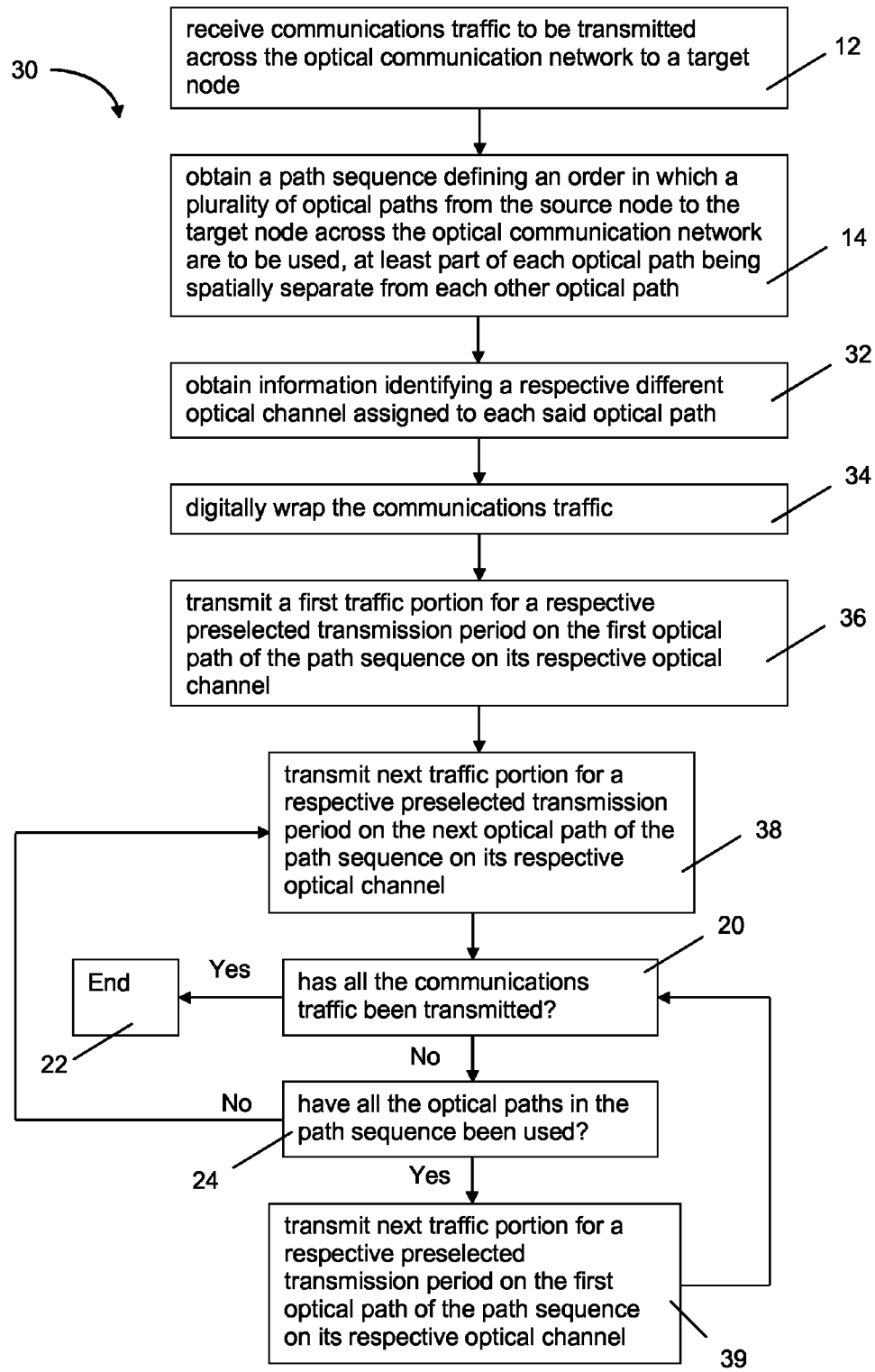
FIG. 2 shows the steps of a method according to a second embodiment of the invention of transmitting communications traffic in an optical communication network comprising a plurality of nodes.

Referring to FIG. 2, a second embodiment of the invention provides a method 30 of transmitting communications traffic in an optical communication network comprising a plurality of nodes which is similar to the method 10, with the following modifications. The same reference numbers are retained for corresponding steps.

In this embodiment, the method comprises obtaining information identifying an optical channel assigned to each optical path 32; each optical path has a respective, different optical channel assigned to it. The communications traffic is digitally wrapped prior to being transmitted 34. Each traffic portion is therefore a portion of the digitally wrapped traffic.

The first traffic portion is transmitted on the first optical path of the path sequence, on the optical channel assigned to the first optical path 36. The next traffic portion is transmitted on the next optical path of the path sequence, on the optical channel assigned to that optical path 38. If all of the communications traffic has been transmitted, the method ends 22. If there is traffic still to be transmitted, the method 10 continues to transmitting the next traffic portion on the next optical path of the path sequence on the optical channel assigned to that optical path 38, and so on. If all of the optical paths in the path sequence have been used 24, the method returns to the first optical path in the path sequence, transmitting the next traffic portion on the first optical path, on the optical channel assigned to the first optical path 39, and so on, following the path sequence until the last traffic portion has been transmitted. The traffic portions are therefore switched onto different optical channels for transmission on the respective optical paths of the path sequence.

Figure 3:
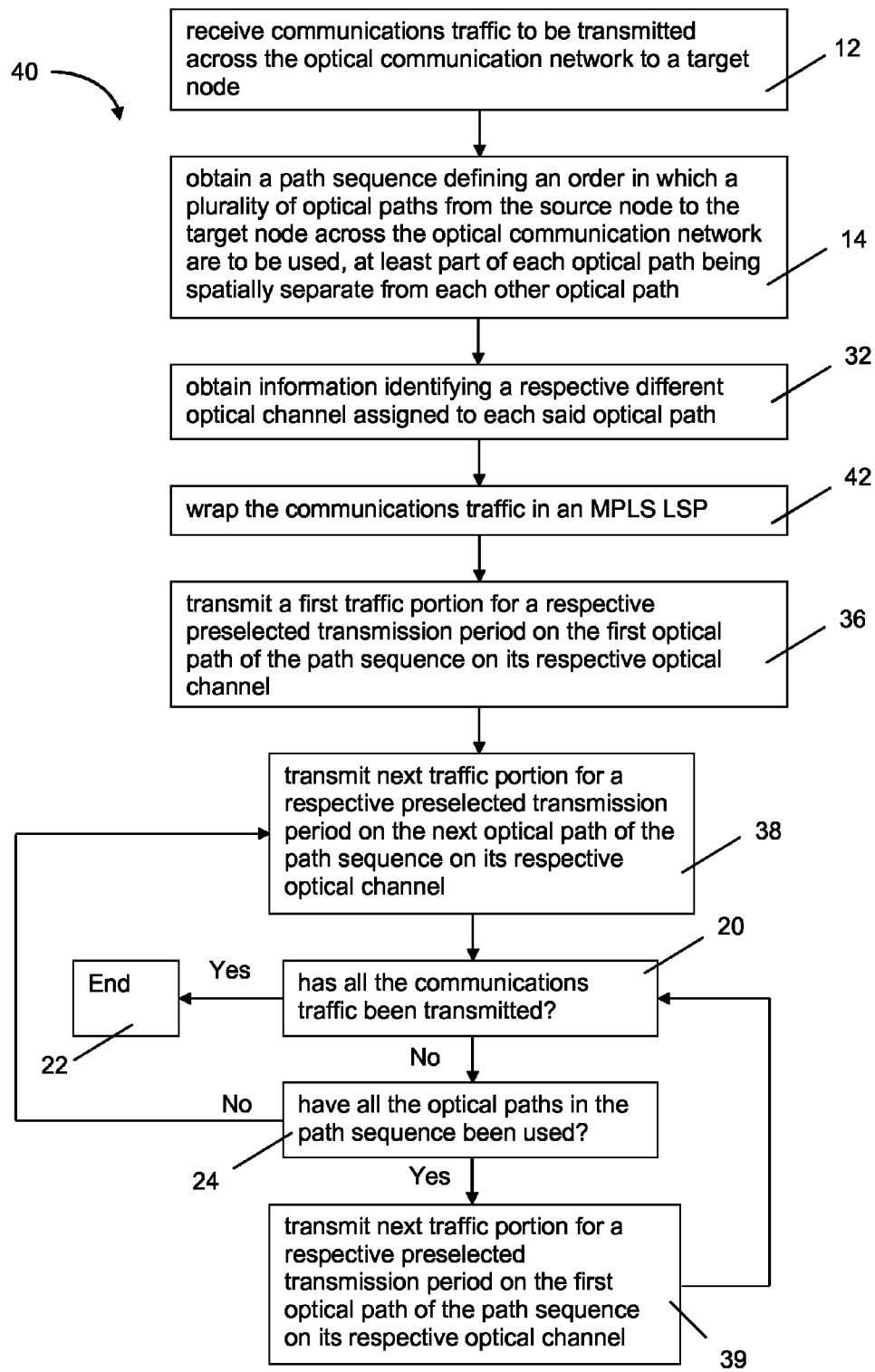
FIG. 3 shows the steps of a method according to a third embodiment of the invention of transmitting communications traffic in an optical communication network comprising a plurality of nodes.

Referring to FIG. 3, a third embodiment of the invention provides a method 40 of transmitting communications traffic in an optical communication network comprising a plurality of nodes which is similar to the method 30, with the following modifications. The same reference numbers are retained for corresponding steps.

In this embodiment, the communications traffic is digitally wrapped in a multi protocol label switching, MPLS, label switched path, LSP, prior to being transmitted 42. Each traffic portion is therefore a portion of the MPLS LSP.

Figure 4:
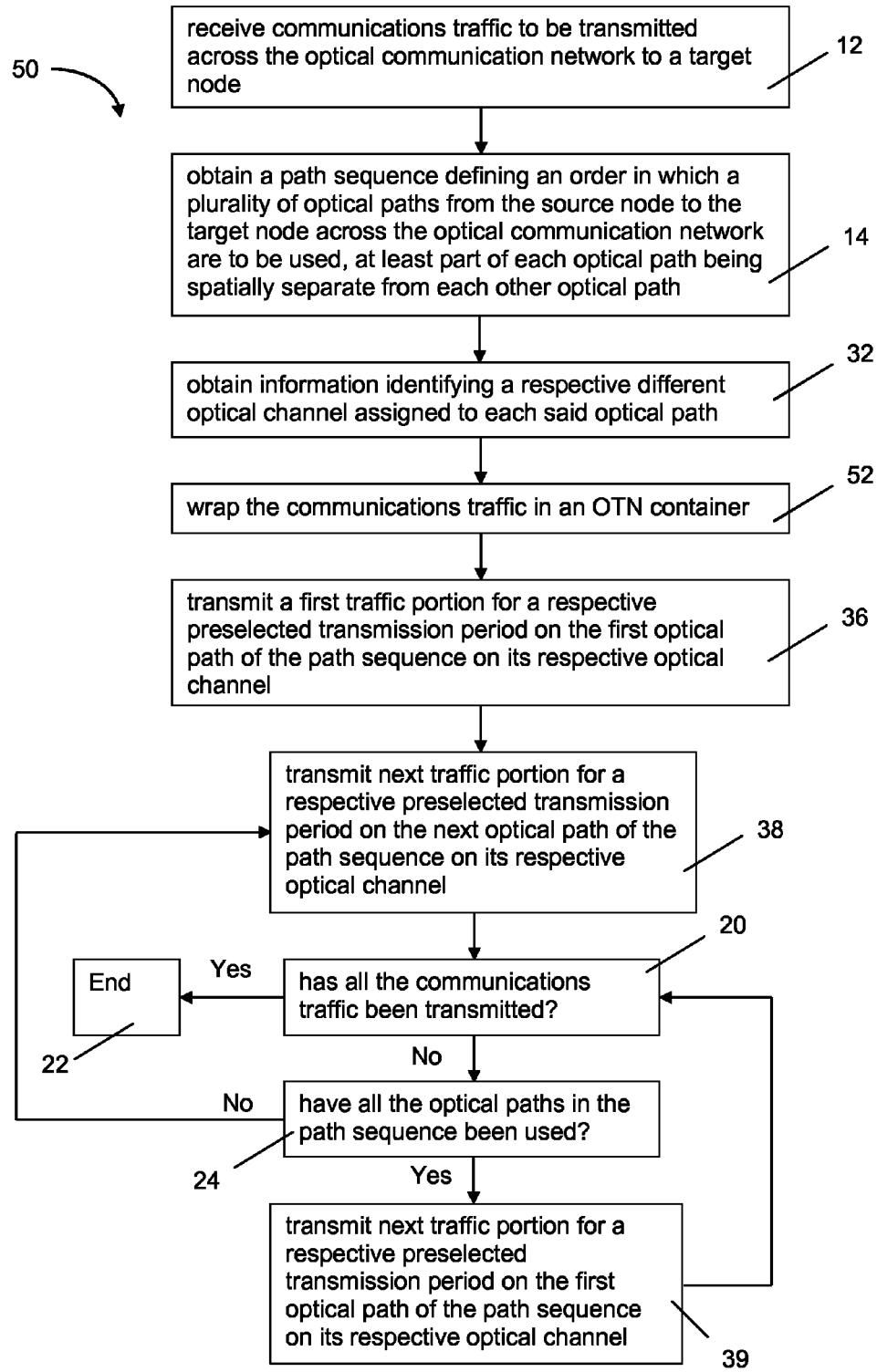
FIG. 4 shows the steps of a method according to a fourth embodiment of the invention of transmitting communications traffic in an optical communication network comprising a plurality of nodes.

Referring to FIG. 4, a fourth embodiment of the invention provides a method 50 of transmitting communications traffic in an optical communication network comprising a plurality of nodes which is similar to the method 30, with the following modifications. The same reference numbers are retained for corresponding steps.

In this embodiment, the communications traffic is digitally wrapped in an optical transport network, OTN, container, for example an optical data unit, ODU, such as ODU1, ODU2 etc., prior to being transmitted 52. Each traffic portion is therefore a portion of the OTN container.

Figure 5:
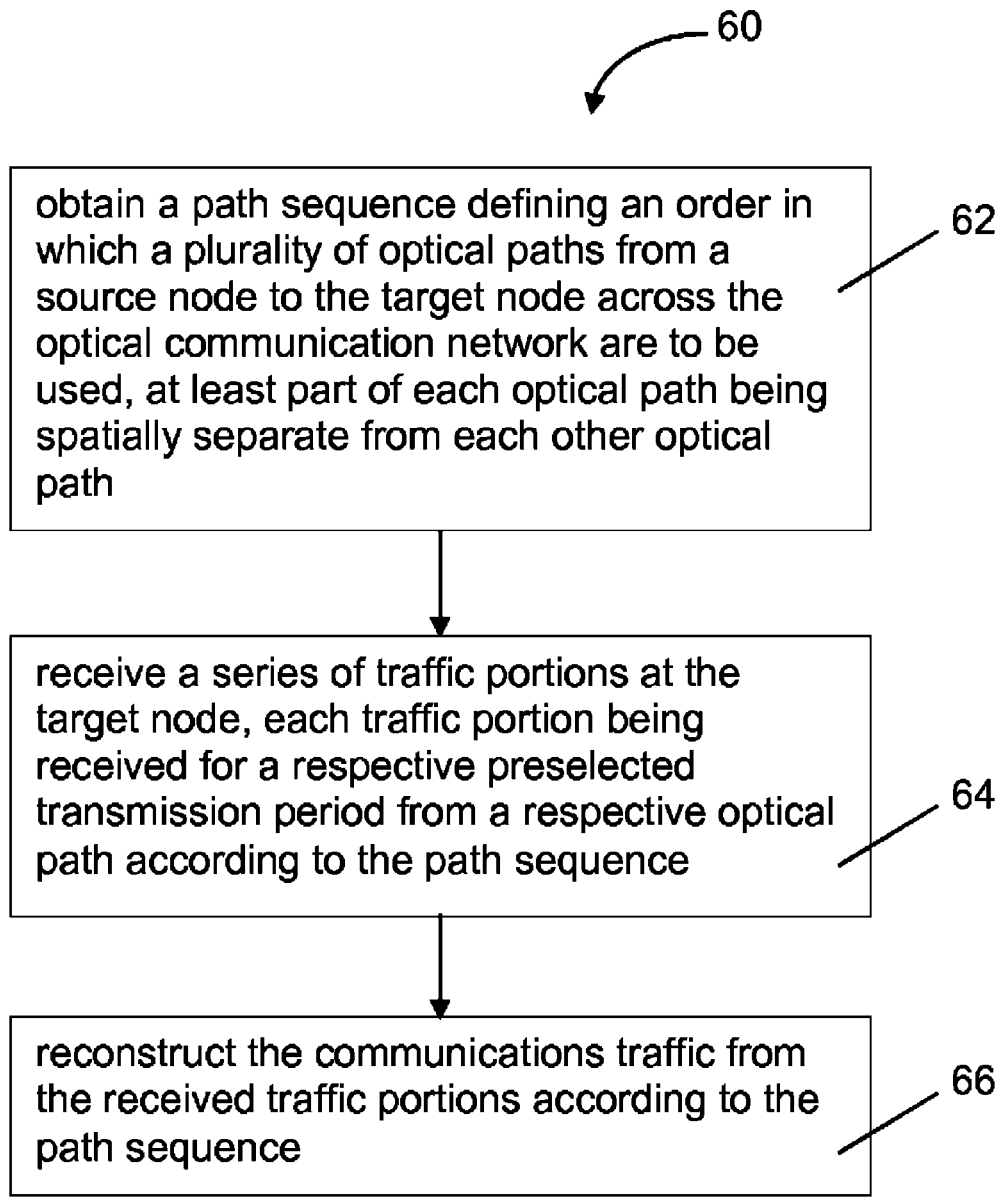
FIG. 5 shows the steps of a method according to a fifth embodiment of the invention of receiving communications traffic in an optical communication network comprising a plurality of nodes.

Referring to FIG. 5, a fifth embodiment of the invention provides a method 60 of receiving communications traffic in an optical communication network comprising a plurality of nodes.

The method 60 comprises obtaining a path sequence defining an order in which a plurality of optical paths from a source node to the target node across the optical communication network are to be used 62. At least part of each optical path is spatially separate from each other optical path.

The method comprises receiving a series of traffic portions at a target node within the optical communication network 64. Each traffic portion is received for a respective preselected transmission period from a respective optical path according to the path sequence. The communications traffic may be digitally wrapped communications traffic.

The method comprises reconstructing the communications traffic from the received traffic portions according to the path sequence 66.

Figure 6:
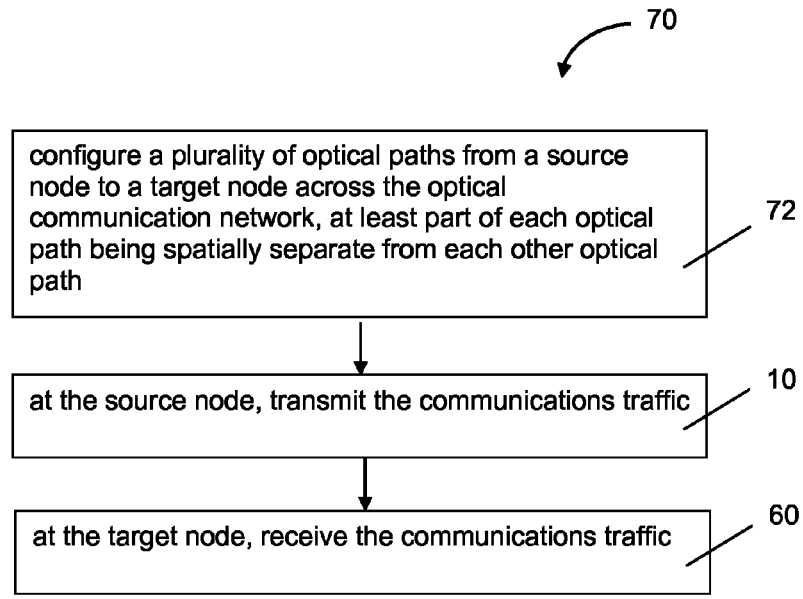
FIG. 6 shows the steps of a method according to a sixth embodiment of the invention of operating an optical communication network comprising a plurality of nodes.

Referring to FIG. 6, a sixth embodiment of the invention provides a method 70 of operating an optical communication network comprising a plurality of nodes.

The method comprises configuring a plurality of optical paths from a source node to a target node across the optical communication network 72. At least part of each optical path is spatially separate from each other optical path.

The method comprises, at the source node, transmitting the communications traffic according to any of the methods 10, 30, 40, 50 described above and shown in FIGS. 1 to 4.

The method comprises, at the target node, receiving the communications traffic according to the method 60 as described above and shown in FIG. 5.

In a seventh embodiment of the invention, which is similar to the method 70 shown in FIG. 6, the spatially separate parts of the optical paths may be physically distinct paths across the optical communication network. Where the network comprises a plurality of smaller networks each operated by a different network operator, the physically distinct paths may additionally be operated by different network operators.

Alternatively, the spatially separate parts of the optical paths may be different optical fibre cables following a shared physical path across the optical communication network or different optical fibres within an optical fibre cable within the optical communication network.

Where parts of two or more optical paths are not physically separate, that is, where they share an optical link or a node within the network, the link or node is required to be in a secure location with guaranteed protection against a tapping attack.

Figure 7:
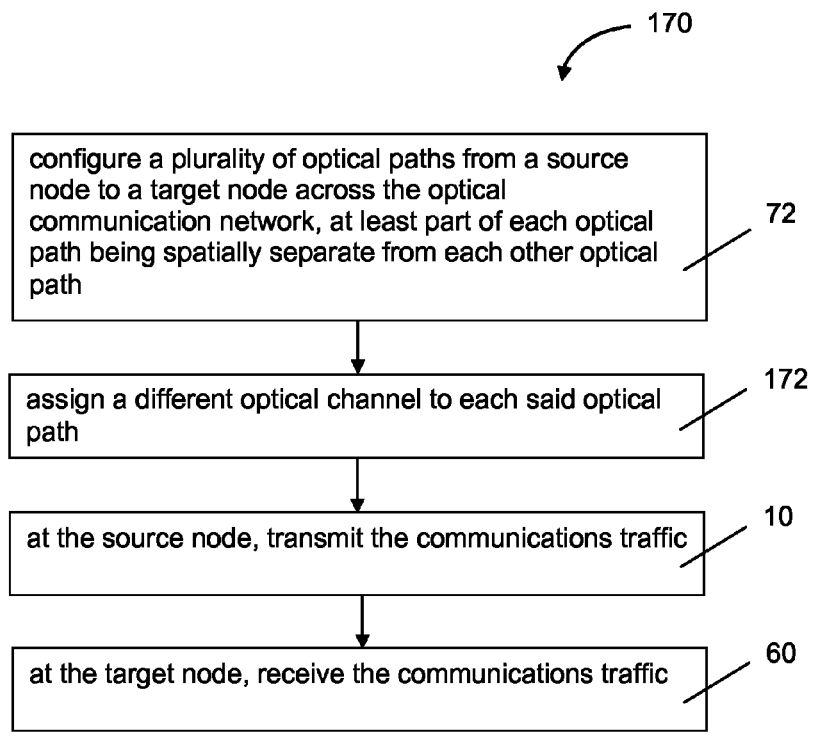
FIG. 7 shows the steps of a method according to an eighth embodiment of the invention of operating an optical communication network comprising a plurality of nodes.

Referring to FIG. 7, an eighth embodiment of the invention provides a method 170 of operating an optical communication network comprising a plurality of nodes which is similar to either of the methods of the sixth and seventh embodiments. The same reference numbers are retained for corresponding steps.

In this embodiment, the method 170 additionally comprises assigning a different optical channel to each of the optical paths which have been configured.

Figure 8:
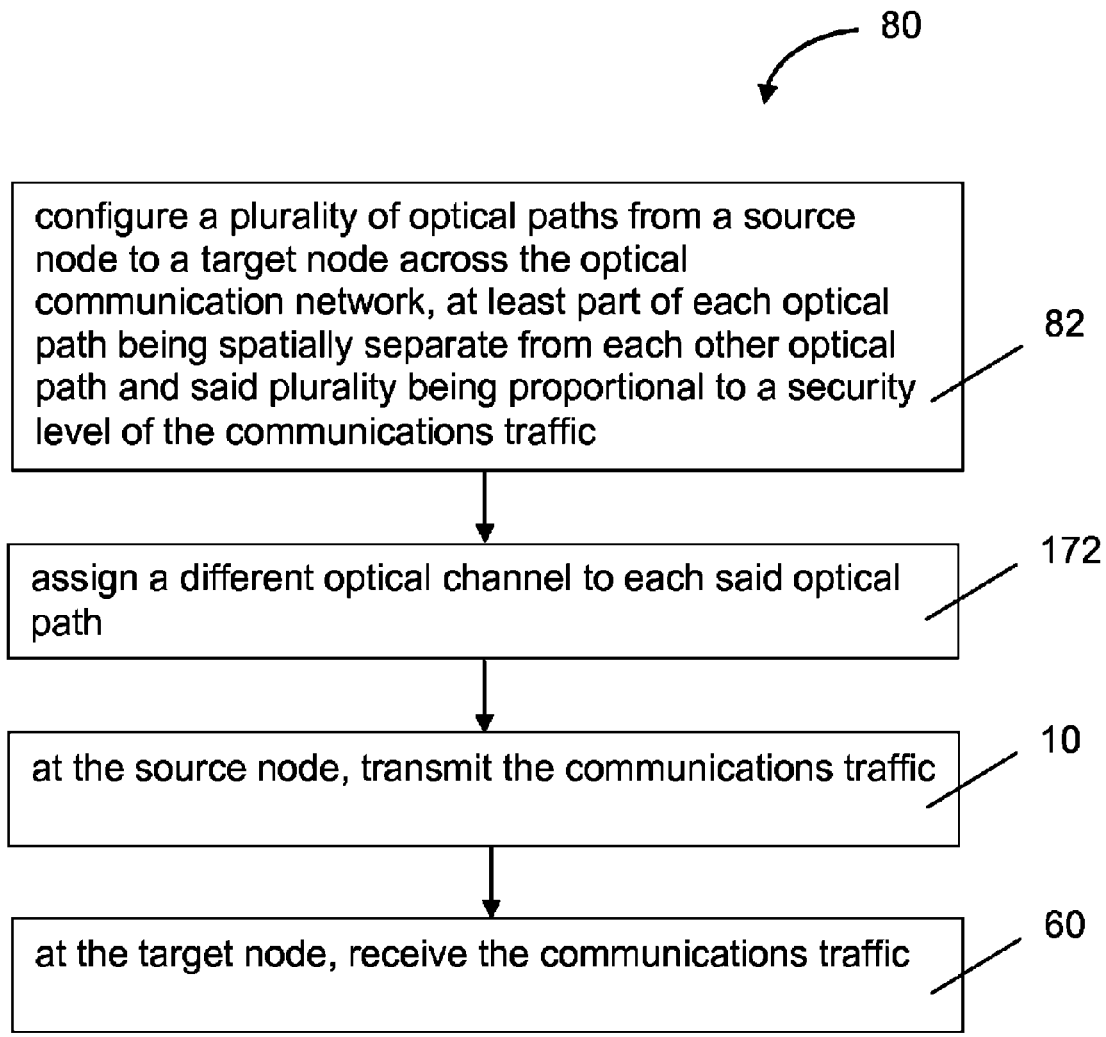
FIG. 8 shows the steps of a method according to a ninth embodiment of the invention of operating an optical communication network comprising a plurality of nodes.

Referring to FIG. 8, a ninth embodiment of the invention provides a method 80 of operating an optical communication network comprising a plurality of nodes which is similar to either of the methods of the sixth and seventh embodiments. The same reference numbers are retained for corresponding steps.

In this embodiment, the optical communication network is to be operated for communications traffic having a security level. The method 80 comprises configuring a plurality of optical paths proportional to the security level 82.

A twentieth embodiment of the invention provides a method operating an optical communication network comprising a plurality of nodes which is similar to the method 80 of FIG. 8, with the following modifications.

In this embodiment, the communications traffic comprises a security marker if the communications traffic has a security level. The method comprises determining whether the communications traffic has a security marker and only transmitting the communications traffic as a series of traffic portions if the communications traffic has a said security marker.

The security marker may comprise information identifying the security level. Where this is the case, the method additionally comprises reading the information to obtain the security level and then configuring the plurality of optical paths to be proportional to the said security level.

Figure 9:
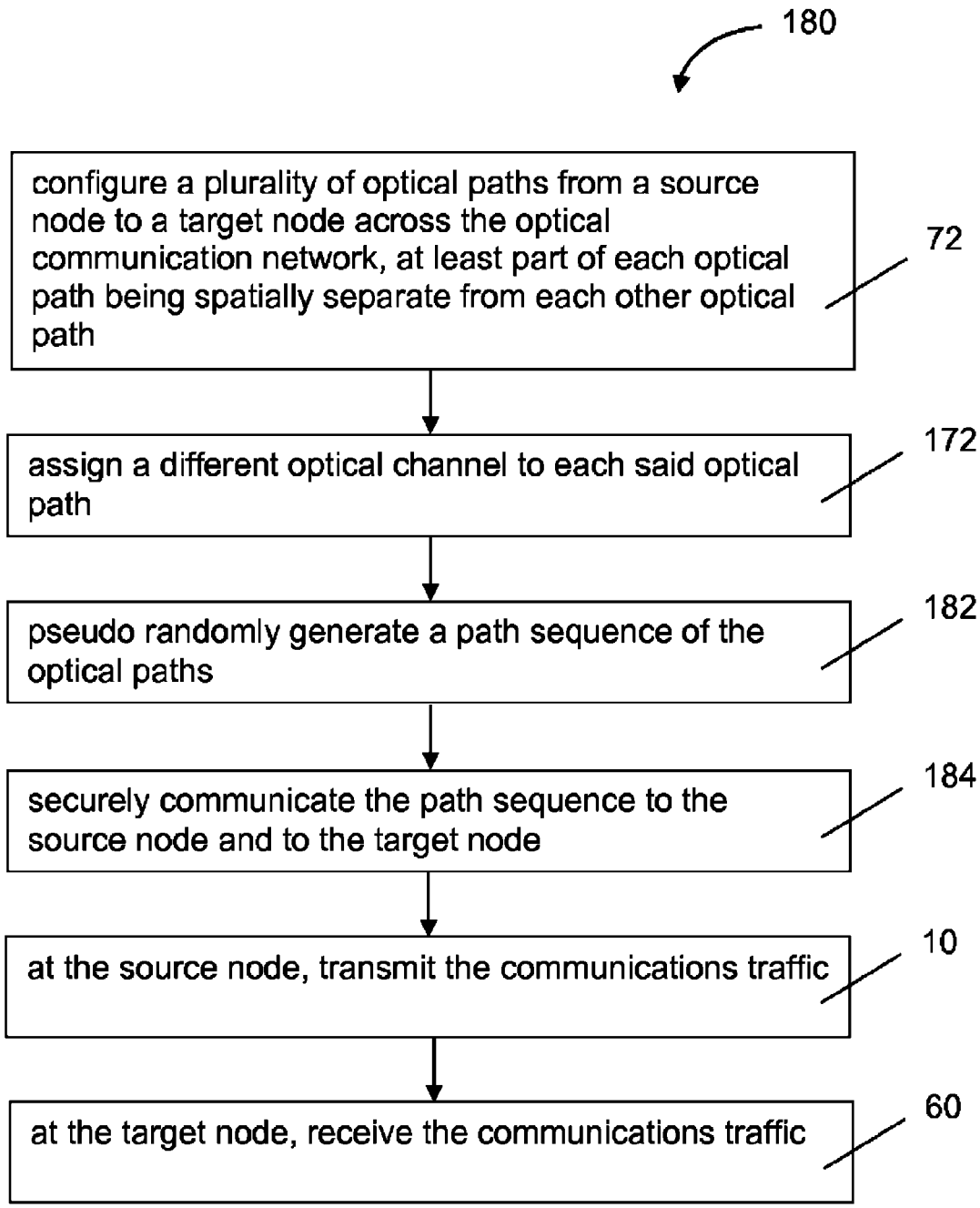
FIG. 9 shows the steps of a method according to a tenth embodiment of the invention of operating an optical communication network comprising a plurality of nodes.

Referring to FIG. 9, a tenth embodiment of the invention provides a method 180 of operating an optical communication network comprising a plurality of nodes which is similar to the method 170 shown in FIG. 7.

The path sequence is either a preselected sequence or a dynamically changing sequence. In this embodiment, a dynamically changing path sequence is used and the method comprises pseudo randomly generating a path sequence of the optical paths which have been configured 182. The path sequence is securely communicated to both the source node and the target node each time it changes 184.

Figure 10:
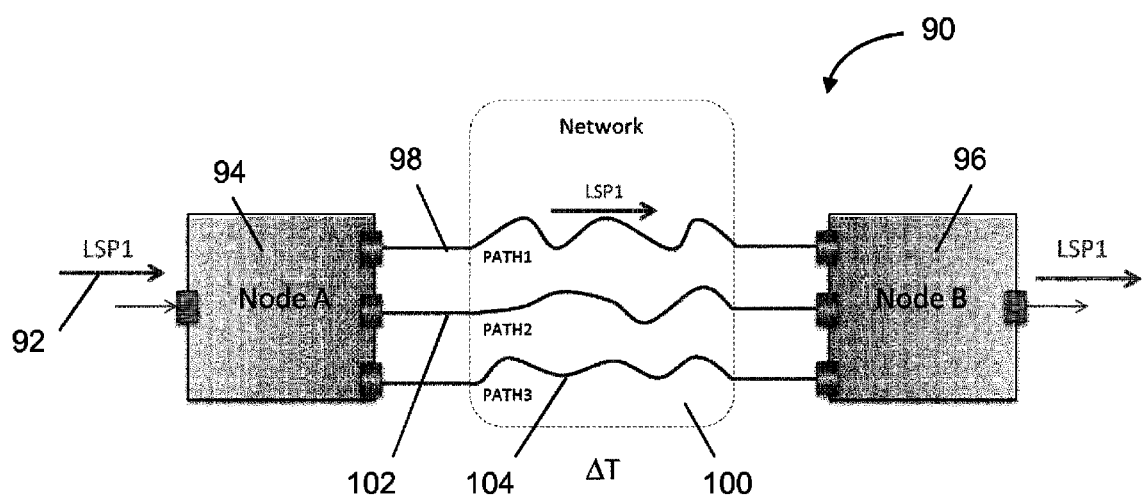
FIG. 10 illustrates transmission of communications traffic on an MPLS LSP using a prior art method.

FIG. 10 illustrates transmission of packet based communications traffic in a conventional manner that will be well known to the person skilled in the art. The traffic is wrapped in an MPLS LSP (LSP1) 92.

Three optical paths, PATH1 98, PATH2 102, PATH3 104 have been configured from a source node (node A) 94 to a target node (node B) 96 across an optical communication network 100. Each optical path comprises a plurality of intermediate nodes and optical links connecting the nodes.

In this example, LSP1 is transmitted on a selected optical channel across PATH 1 and the transmission of LSP1 takes a certain amount of time, ΔT, to complete.

Figure 11:
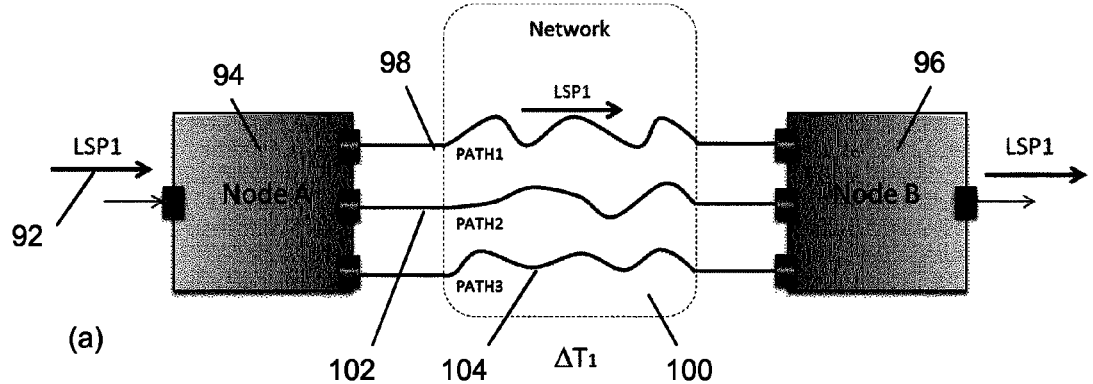
FIG. 11 illustrates transmission of communications traffic on an MPLS LSP according to an eleventh embodiment of the invention.
Figure 11:
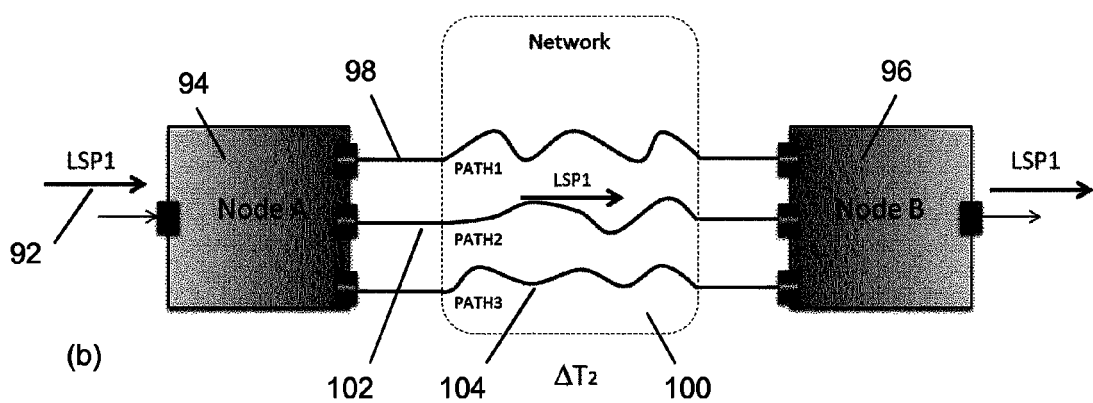
Figure 11:
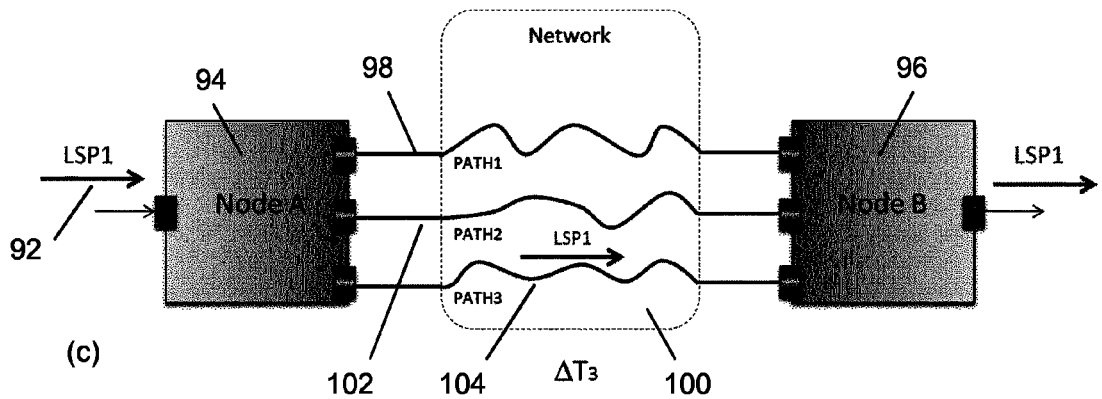

FIG. 11 illustrates a method of operating an optical communication network according to an eleventh embodiment of the invention.

Three optical paths are configured, as in FIG. 10, and a different optical channel is assigned to each optical path. The optical paths are entirely spatially separate from each other in this embodiment. However, the optical paths do not have to be spatially separate and may alternatively comprise two optical fibres following the same point to point path across the network, either in the form of separate optical cables or two optical fibres within the same optical cables.

Communications traffic is received and is wrapped in an MPLS LSP (LSP1) 92. LSP1 is transmitted across the network using the three paths PATH1, PATH2 and PATH3 in a "circular" sequence of the paths. As shown in FIG. 11(a), LPS1 is transmitted over PATH1 for a preselected transmission period ΔT1. A first portion of LSP1 is thereby transmitted on the first optical path in the path sequence. Then LSP1 is switched to PATH2, shown in FIG. 11(b), on which it is transmitted for a preselected transmission period ΔT2. A second portion of LSP1 is thereby transmitted on the second optical path in the path sequence. After that LSP1 is switched to PATH3, as shown in FIG. 11(c) for a preselected transmission period ΔT3. A third portion of LSP1 is thereby transmitted on the third optical path in the path sequence. At the end of this sequence of spatial hops, that is to say once the end of the path sequence has been reached, LSP1 is switched back onto PATH1, so the fourth portion of LSP1 will be transmitted on the first optical path in the path sequence, and so on. This process continues, following the path sequence, while LSP1 remains active, i.e. until the whole of LSP1 has been transmitted.

The switching of LSP1 from one path to the next may be achieved using a known protection switching mechanism, which is used for conventional failure recovery at the packet layer. In this scenario, when an optical path is no longer available, for example due to a fibre cut, the LSP which was using this path is sent to an alternative path. In this embodiment, the action of rerouting LSPs for failure recovery is used to reroute LSP1 from PATH1 to PATH2, etc. to achieve spatial hopping.

The switching of LSP1 from one path to the next may be instigated on expiry of a timer set to the preselected transmission period. Alternatively, switching of LSP1 may be effected by periodically inserting a fictitious signal degrade at the source node, to cause the network's protection switching mechanism to cause the switching of LSP1 onto its next optical path of the path sequence. This may be implemented as follows:

a) configure a pair of worker and protection paths according to the path sequence, the pair having a non-revertive mode;
b) create a fictitious signal degrade on the worker path to be switched;
c) allow the protection switching to switch from the worker path to its paired protection path;
d) change the worker/protection path pair configuration to create new protection/worker pairs according to next switching step in the path sequence;
e) restart at b).

Using an existing protection switching mechanism within an optical communication network has the advantage of ease of implementation. No hardware protocols need to be changed.

Considering a switching time, Ts, of 50 ms and a hopping frequency, Rh, being the number of times per second that the optical path being used to transmit LSP1 is changed, the method may cause a reduction in communication traffic throughput of Ts*Rh. To keep the throughput loss less than 1% a hopping frequency of less than 0.2 Hz should be used.

In order to reduce transmission performance degradation due to switching transmission of LSP1 onto different optical paths, the communications traffic to be transmitted during each transmission period may be stored in a buffer for a period at least equal to the switching time to change from one optical path to the next in the path sequence and then released at higher rate to enable continuous transmission of LSP1 without loss of traffic. As alternative, before starting transmission the whole of LSP1 may be stored in a buffer for a period at least equal to the total of the switching times required, in order to adsorb the time required to switch LSP1 onto each of the optical paths of the path sequence.

Alternatively, transmission performance degradation may be reduced by communicating the path sequence to both the source node and the target node and synchronising transmission and reception so that the source node and target node automatically switch to the optical transmitter and optical receiver assigned to the next optical path of the path sequence. A protocol similar to that used in Bluetooth wireless communication systems to implement frequency hopping to counteract narrowband interference may be used to implement this.

In this embodiment it is the MPLS LSP that is switched onto the different optical channels assigned to each optical path rather than the optical channel itself which is switched. So the action of switching the traffic onto the different optical paths in the path sequence is done in the digital domain at the IP/MPLS level and not at the optical layer.

Alternatively, the communications traffic may be wrapped in an OTN container, such as ODU1, ODU2 etc., which is switched onto the different optical paths in the same manner. In addition, the communications traffic may be transmitted on a single optical channel which is switched onto the different optical paths, using for example an optical-electrical-optical, OEO, switch.

If an attacker taps an optical link within PATH1 they will be able to tap LSP1 only for the transmission period during which LSP1 is transmitted on PATH1. The transmission period is set such that the traffic transmitted during the preselected transmission period, i.e. the traffic within the first traffic portion transmitted over PATH1, is not auto-consistent, that is to say the traffic can only be reconstructed when recombined with at least one other traffic portion of LSP1. This means that the traffic within one single traffic portion is never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker. The transmission period may for example be selected according to a known cryptographic data splitting algorithm or a known cloud storage data splitting algorithm.

For simplicity, FIG. 11 only shows spatial hopping between three alternative optical paths. In general, a larger number of optical paths may be configured. In this embodiment the path sequence is deterministic: PATH1, PATH2, PATH3.

The path sequence may be pre-established, and the source node and target node configured with the path sequence during network configuration, to avoid the requirement for any signalling at the optical layer during network operation. Alternatively, the path sequence may be configured statically in the source node and the target node and communicated to the nodes periodically. To increase the security of transmission of the communications traffic the path sequence may be scrambled and communicated to the source and target nodes (Node A and Node B in FIG. 11) on a path sequence signal sent on a secure connection between the network controller and the nodes themselves. This may add an additional security level.

Figure 12:
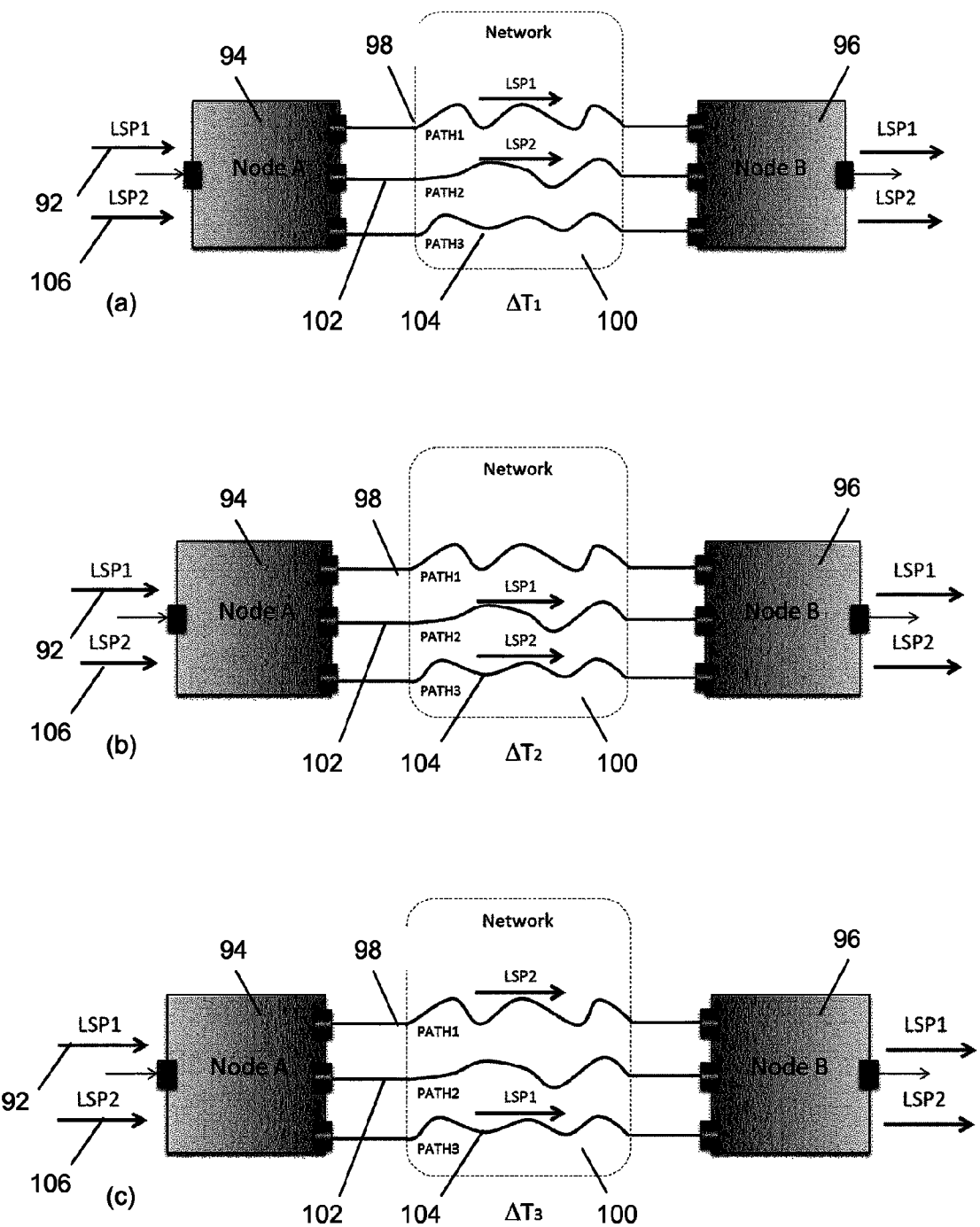
FIG. 12 illustrates transmission of communications traffic on two MPLS LSPs according to the eleventh embodiment of the invention.

FIG. 12 illustrates how the method of the eleventh embodiment, shown in FIG. 11, may be extended to transmit two MLPS LSPs, LSP1 92 and LSP2 106, each containing respective communications traffic.

Conventionally, two LSPs would be transmitted either on two optical channels, on two optical paths of the network 100, or on the same optical channel, on the same optical path. In this embodiment, each LSP is transmitted on the optical paths following the path sequence as illustrated in FIG. 11, but while transmission of LSP1 starts on PATH1 98, transmission of LSP2 starts on PATH2 102.

LPS1 is transmitted over PATH1 for transmission period $\Delta T1$ and during same transmission period LSP2 is transmitted over PATH2, as shown in FIG. 12(a). LSP1 is then switched to PATH2 and LSP2 is switched to PATH3, on which they are transmitted for transmission period $\Delta T2$, as in FIG. 12(b). LSP1 is then switched to PATH3 and LPS2 is switched to PATH1, for transmission period $\Delta T3$. At the end of the path sequence LSP1 is switched backed onto PATH1 and LSP2 is switched back on PATH2. This process continues while LSP1 remains active and continues while LSP2 remains active, i.e. until the whole of LSP1 and LSP2 have each been transmitted.

Figure 13:
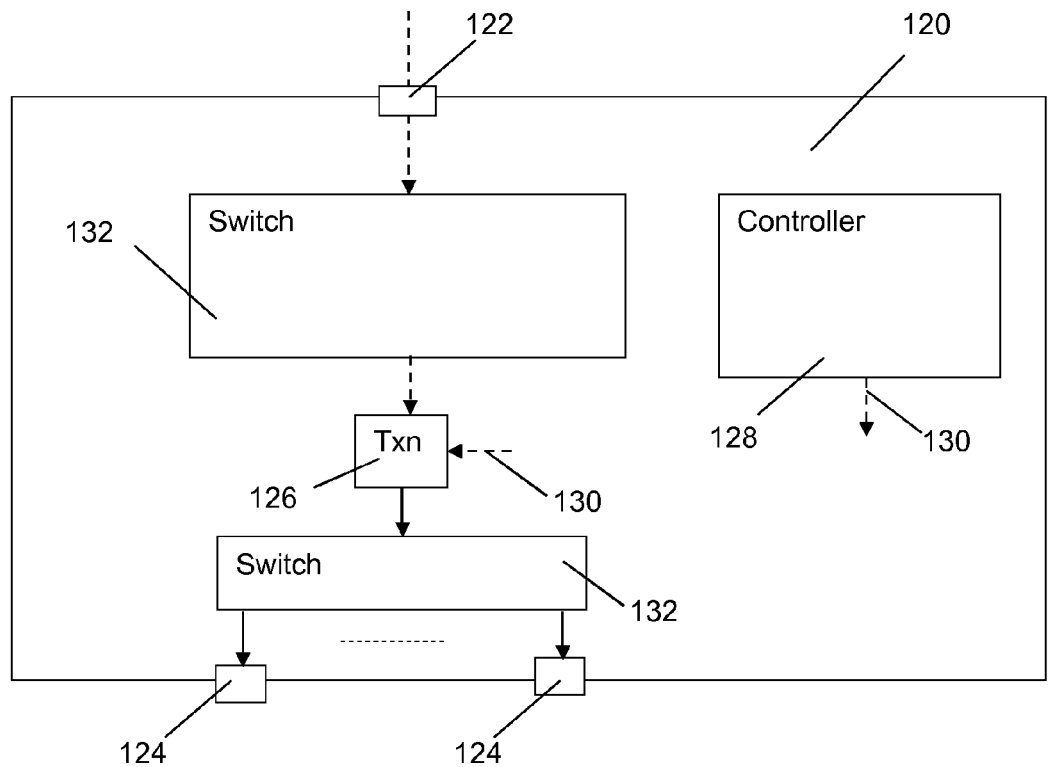
FIG. 13 is a schematic representation of a communication network transmitter module according to a twelfth embodiment of the invention.

Referring to FIG. 13, a twelfth embodiment of the invention provides an optical communication network transmitter module 120 comprising an input 122, a plurality of outputs 124, an optical transmitter 126 and a module controller 128.

The input 122 is arranged to receive communications traffic to be transmitted. Each output 124 is arranged to be coupled to a respective one of a plurality of optical paths across an optical communication network.

The module controller 128 is arranged to obtain a path sequence defining an order in which a plurality of optical paths from the transmitter module to a target node across the optical communication network are to be used. At least part of each optical path is spatially separate from each other optical path.

The module controller 128 is arranged to generate and transmit a transmitter control signal 130 containing instructions arranged to cause the optical transmitter to transmit the communications traffic as a series of traffic portions. The instructions are arranged to cause each traffic portion to be transmitted for a respective preselected transmission period on a respective optical path according to the path sequence.

In this embodiment, the transmitter module 120 also comprises an optical switch 132 between the optical transmitter 126 and the outputs 124. The optical switch is configurable to connect the optical transmitter 126 to a selected on of the outputs 124, to follow the path sequence.

Figure 14:
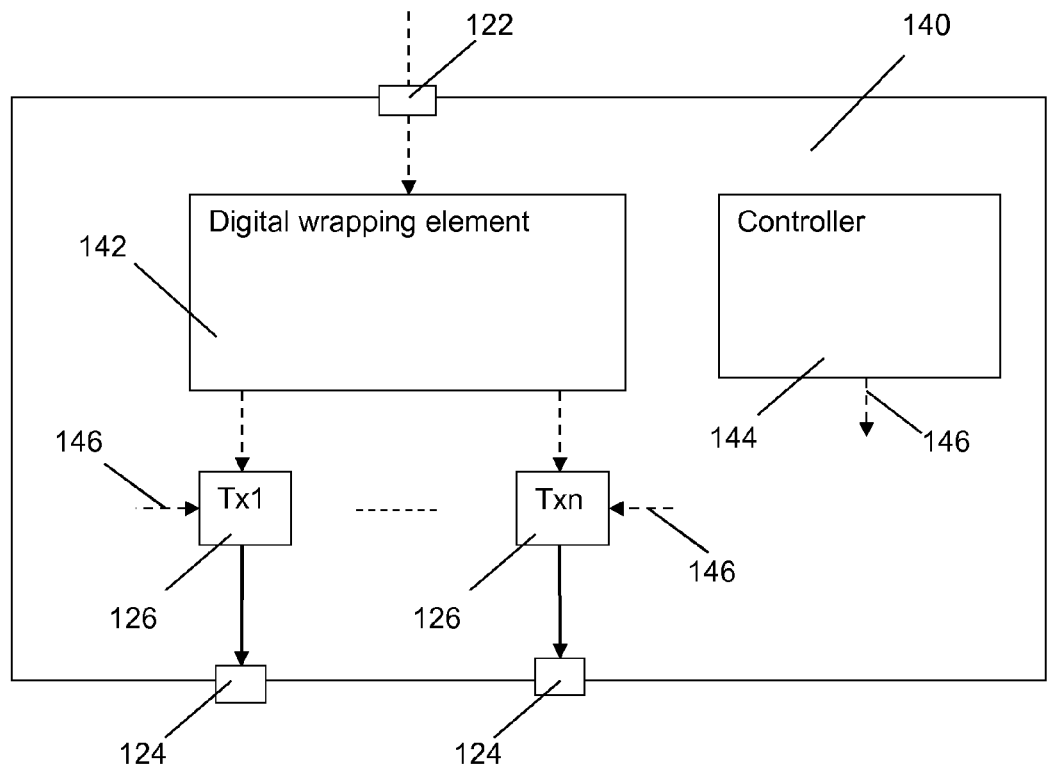
FIG. 14 is a schematic representation of a communication network transmitter module according to a thirteenth embodiment of the invention.

Referring to FIG. 14, a thirteenth embodiment of the invention provides an optical communication network transmitter module 140 which is similar to the optical communication network transmitter module 120 of FIG. 13, with the following modifications. The same reference numbers are retained for corresponding features.

In this embodiment, the transmitter module 140 comprises a plurality of optical transmitters 126 and a digital wrapping element 142.

Each optical transmitter is arranged to operate at a different one of a plurality of optical channels. Each is coupled to a respective one of the optical outputs 124.

The digital wrapping element 142 is arranged to digitally wrap the communications traffic.

In this embodiment, a transmitter control signal 146 is transmitted to each optical transmitter. The transmitter control signals contain instructions arranged to cause the optical transmitters to transmit the digitally wrapped communications traffic as a series of traffic portions. The instructions are arranged to cause each optical transmitter to transmit the digitally wrapped communications traffic on its respective optical channel for a respective preselected transmission period according to the path sequence. The communications traffic is thereby split into traffic portions each of which are transmitted on a respective optical path of the path sequence.

Figure 15:
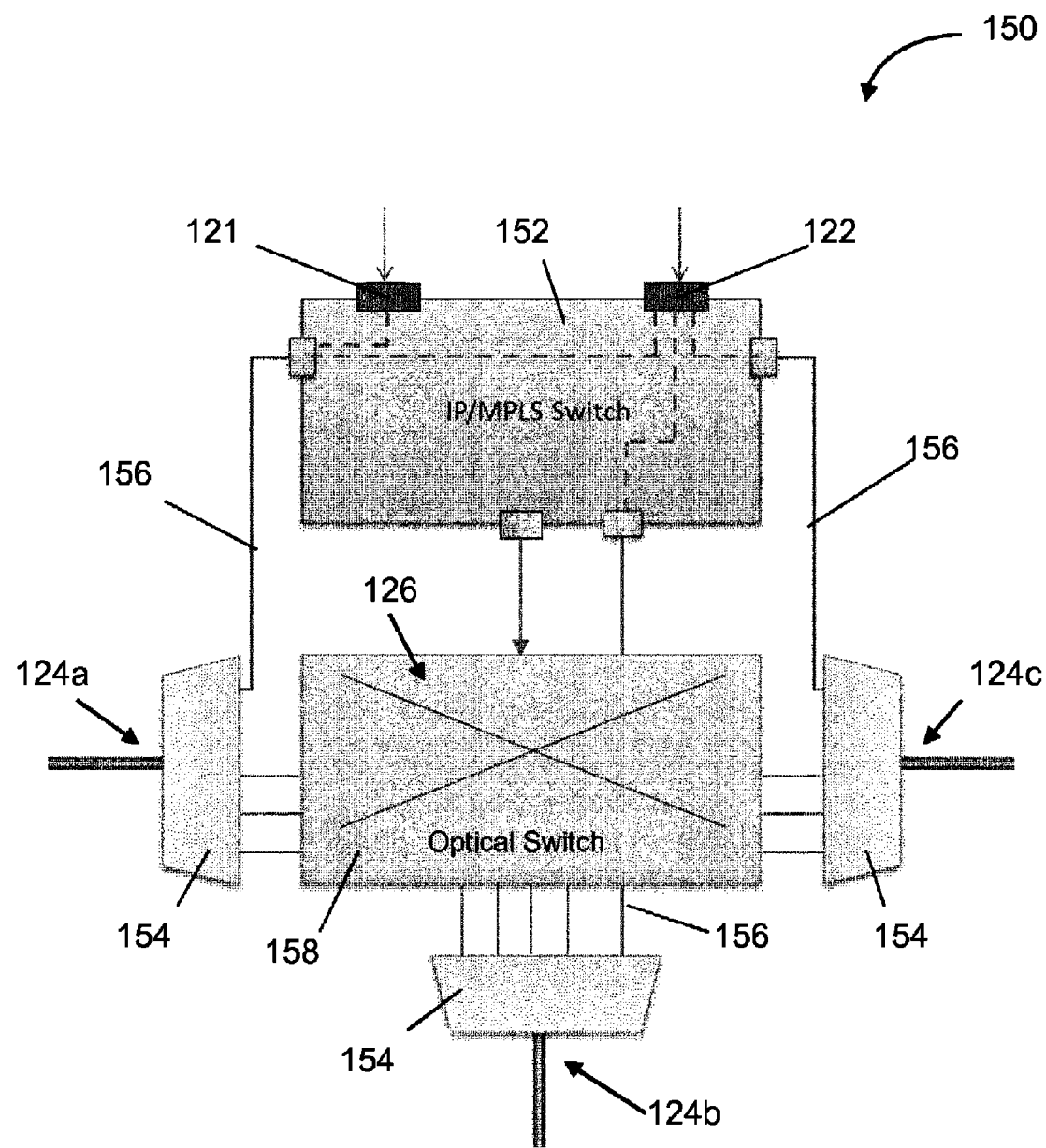
FIG. 15 is a schematic representation of a communication network transmitter module according to a fourteenth embodiment of the invention.

Referring to FIG. 15, a fourteenth embodiment of the invention provides an optical communication network transmitter module 150 which is similar to the optical communication network transmitter module 140 of FIG. 14, with the following modifications. The same reference numbers are retained for corresponding features.

The transmitter module of this embodiment is a packet-optical transmitter module comprising an IP/MPLS switch 152 and an optical switch 158, for example a reconfigurable optical add-drop multiplexer, ROADM. The optical switch is coupled to the outputs 124 by optical multiplexers 154, such as an arrayed waveguide grating, AWG, or a wavelength selective switch, WSS. The IP/MPLS switch is arranged to generate control signals 156 comprising instructions arranged to request optical connectivity at the optical layer. Communications traffic packets received at the transmitter module 150 are wrapped in MPLS LSPs by the IP/MPLS switch 152.

The IP/MPLS switch 152 has a first input 121 for receiving communications traffic which is not to be transmitted as traffic portions. As can be seen, a single control signal 156 is generated, since all of the communications traffic is to be transmitted on a single optical path. The IP/MPLS switch 152 also has a second input 122 for receiving communications traffic which is to be wrapped in an MPLS LSP, to be transmitted as traffic portions on different optical paths of the path sequence, as described above.

Figure 16:
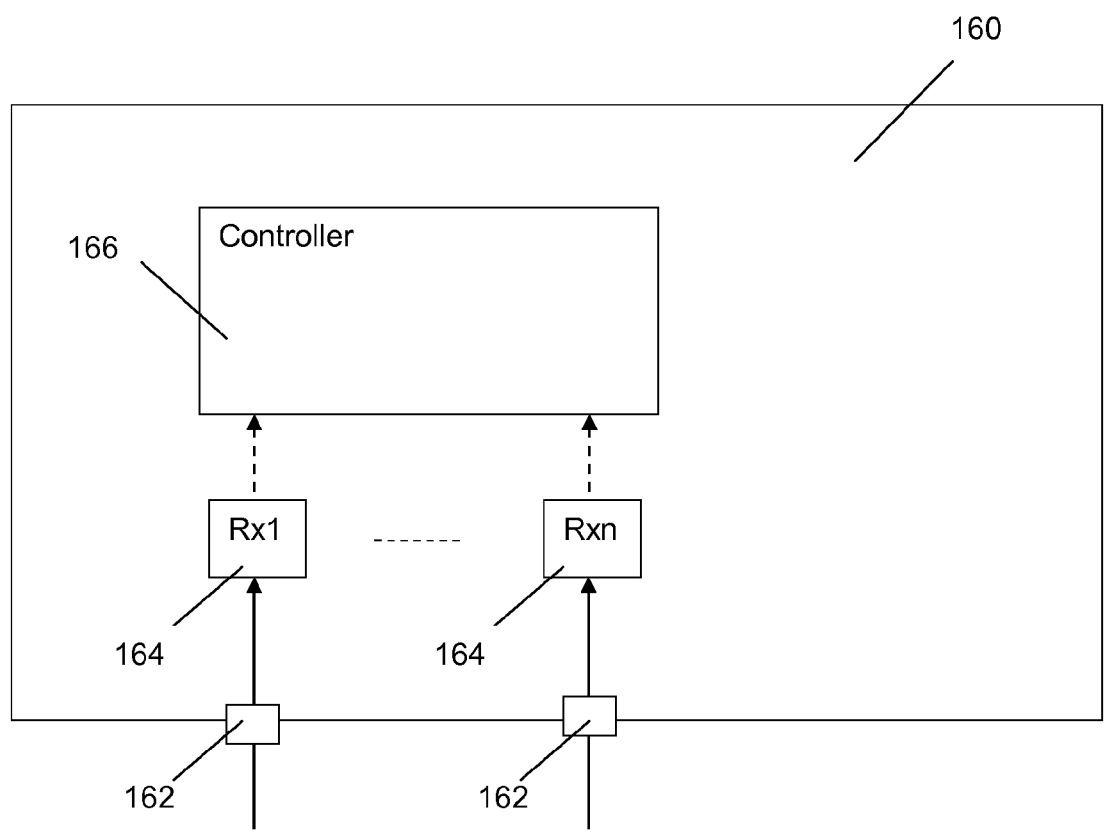
FIG. 16 is a schematic representation of a communication network receiver module according to a fifteenth embodiment of the invention.

Referring to FIG. 16, a fifteenth embodiment of the invention provides an optical communication network receiver module 160 comprising a plurality of inputs 162, a plurality of optical receivers 164 and a module controller 166.

Each input is arranged to be coupled to a respective one of a plurality of optical paths across an optical communication network from a source node to the receiver module. At least part of each optical path is spatially separate from each other optical path. Each optical receiver 164 is coupled to a respective one of the inputs.

The module controller 166 is arranged to:
obtain a path sequence defining an order in which the plurality of optical paths across the optical communication network are to be used;
receive a series of traffic portions, each traffic portion being received for a respective preselected transmission period on a respective optical channel from a respective optical path according to the path sequence; and
reconstruct the communications traffic from the received traffic portions according to the path sequence.

The communications traffic in each traffic portion may only be reconstructed when recombined with at least one other said traffic portion. This means that one single traffic portion in never sufficient to allow an attacker to reconstruct the communications traffic, which may ensure that even if there is an optical fibre tapping attack on an optical fibre of one of the optical paths, the communications traffic obtained by the attacker cannot provide any useful information to the attacker.

Figure 17:
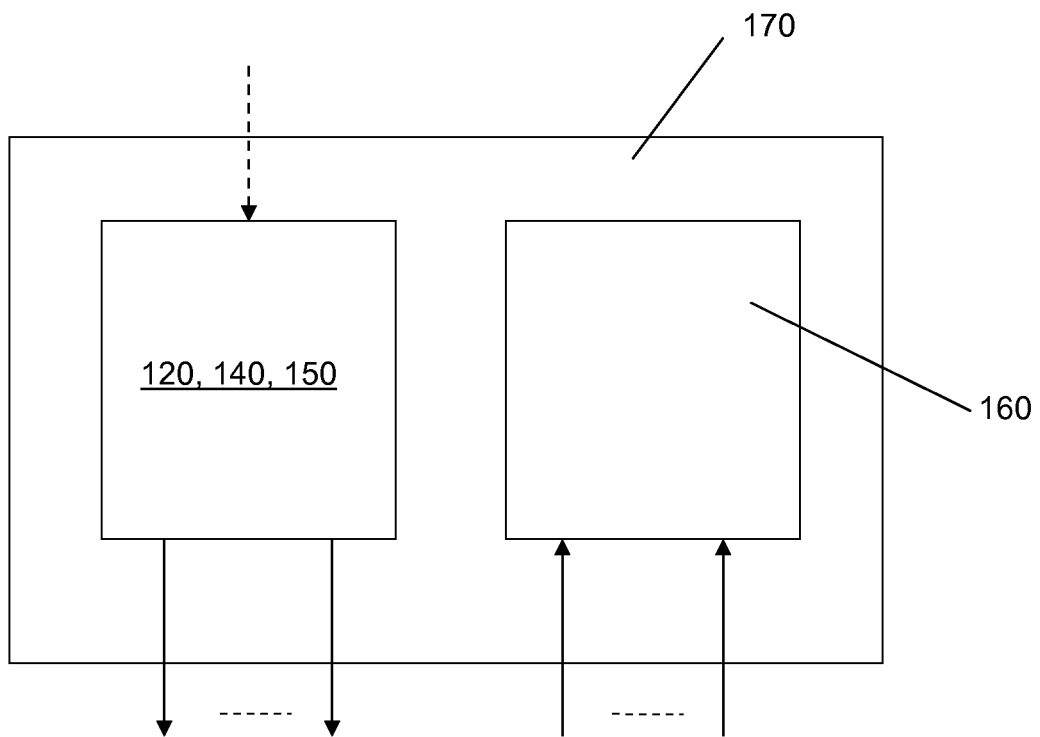
FIG. 17 is a schematic representation of a communication network node according to a sixteenth embodiment of the invention.

Referring to FIG. 17, a sixteenth embodiment of the invention provides an optical communication network node 170 comprising an optical communication network transmitter 120 as shown in FIG. 13 and an optical communication network receiver 160 as shown in FIG. 16.

The node 170 may alternatively comprise an optical communication network transmitter 140 as shown in FIG. 14 or an optical communication network transmitter 150 as shown in FIG. 15.

Figure 18:
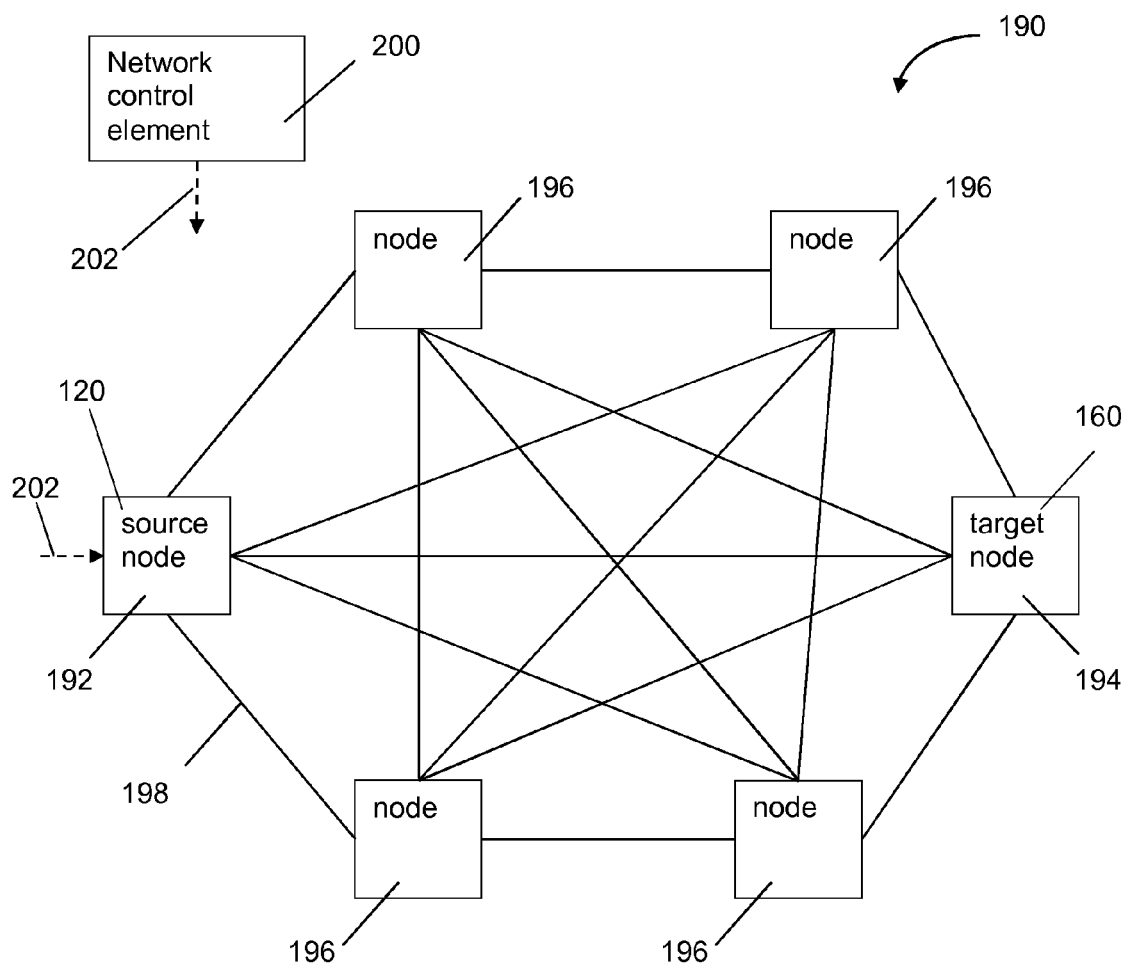
FIG. 18 is a schematic representation of a communication network according to a seventeenth embodiment of the invention.

Referring to FIG. 18, a seventeenth embodiment of the invention provides an optical communication network 190 comprising a source node 192, a target node 194, a plurality of intermediate nodes 196, a plurality of optical fibre links 198 each connecting a pair of the nodes and a network control element 200.

The source node 192 comprises an optical communication network transmitter module 120 as shown in FIG. 13. It will be understood that the optical transmitter modules 140, 150 shown in FIGS. 14 and 15 may alternatively be used. The target node 194 comprises an optical communication network receiver module 160 as shown in FIG. 16.

The network 190 is shown here as being a meshed network but other network configurations may be used. The network does not have to be a meshed network, it is sufficient that at least two disjointed/spatially separate paths exist between the source and target nodes. A meshed network may provide an advantage that a larger number of spatially separate paths may be configured.

The network control element 200 is arranged to configure a plurality of optical paths from the source node 192 to the target node 194 across the network 190. Each optical path comprises at least one optical link 198 and may comprise one or more of the intermediate nodes 196. At least part of each optical path is spatially separate from each other optical path. In this embodiment the optical paths are physically distinct paths across the network. The optical paths may alternatively comprise different optical fibres sharing the same point to point path across the network, which may be implemented as optical fibres in different optical cables following the same path or as different optical fibres sharing the same optical cables along the path.

The network control element 200 is additionally arranged to generate a path sequence defining an order in which the optical paths are to be used. In this embodiment, the network control element is additionally arranged to generate and transmit a path sequence signal 202 containing the path sequence to the source node.

An eighteenth embodiment of the invention provides an optical communication network having the same structure as the network 190 shown in FIG. 18. In this embodiment, the communications traffic has a security level and the network control element 200 is arranged to configure a plurality of optical paths proportional to the security level.

The communications traffic may comprise a security marker to indicate that it is to be transmitted as a series of traffic portions according to the path sequence. The transmitter module controller may additionally be arranged to determine whether a security marker is present on the communications traffic and to transmit the communications traffic as a series of traffic portions only if a security marker is present.

The security marker may contain information identifying the security level of the communications traffic and the network control element is arranged to configure a plurality of optical paths proportional to that security level.

A nineteenth embodiment of the invention provides an optical communication network having the same structure as the network 190 shown in FIG. 18. In this embodiment, the network control element 200 is arranged to generate a dynamically changing path sequence by pseudo randomly generating a sequence of the optical paths. The network control element is additionally arranged to generate and transmit a path sequence signal 202 containing the path sequence to the first node and to the second node.

The invention claimed is:

1. A method of transmitting communications traffic in an optical communication network comprising a plurality of nodes, the method comprising, at a source node:
    receiving communications traffic to be transmitted across the optical communication network to a target node;
    obtaining a path sequence defining an order in which a plurality of optical paths from the source node to the target node across the optical communication network are to be used, at least part of each optical path being spatially separate from each other optical path; and
    transmitting, over a series of transmission periods, the communications traffic as a series of traffic portions, each traffic portion being transmitted for a respective preselected one of the transmission periods on a respective one of the optical paths according to the path sequence, wherein transmission of the series of traffic portions is distributed among the optical paths, and
    wherein the path sequence is a preselected sequence, and wherein only one of the optical paths is used during each of the transmission periods.

2. A method as claimed in claim 1, wherein the method comprises obtaining information identifying a respective different optical channel assigned to each said optical path and digitally wrapping the communications traffic, and wherein the digitally wrapped communications traffic is transmitted as a series of traffic portions, each traffic portion being transmitted on the optical channel assigned to its respective optical path.

3. A method of receiving communications traffic in an optical communication network comprising a plurality of nodes, the method comprising:
    obtaining a path sequence defining an order in which a plurality of optical paths from a source node to a target node across the optical communication network are to be used, at least part of each optical path being spatially separate from each other optical path;
    receiving, over a series of transmission periods, a series of traffic portions at the target node, each traffic portion being received for a respective preselected one of the transmission periods from a respective one of the optical paths according to the path sequence, wherein reception of the series of traffic portions is distributed among the optical paths; and
    reconstructing the communications traffic from the received traffic portions according to the path sequence, wherein the path sequence is a preselected sequence, and wherein only one of the optical paths is used during each of the transmission periods.

4. A method as claimed in claim 3, wherein each traffic portion is a portion of digitally wrapped communications traffic.

5. A method as claimed in claim 3, wherein the communications traffic in each said traffic portion can only be reconstructed when recombined with at least one other said traffic portion.

6. A method as claimed in claim 3, wherein the spatially separate parts of the optical paths comprise one of physically distinct paths across the optical communication network, different optical fibre cables following a shared physical path across the optical communication network and different optical fibres within an optical fibre cable within the optical communication network.

7. An optical communication network transmitter module comprising:
   an input arranged to receive communications traffic to be transmitted;
   a plurality of outputs, each arranged to be coupled to a respective one of a plurality of optical paths across an optical communication network;
   an optical transmitter; and
   a module controller arranged to:
      obtain a path sequence defining an order in which a plurality of optical paths from the transmitter module to a target node across the optical communication network are to be used, at least part of each optical path being spatially separate from each other optical path; and
      generate and transmit at least one transmitter control signal containing instructions arranged to cause the optical transmitter to transmit, over a series of transmission periods, the communications traffic as a series of traffic portions, the instructions arranged to cause each traffic portion to be transmitted for a respective preselected one of the transmission periods on a respective one of the optical paths according to the path sequence, wherein transmission of the series of traffic portions is distributed among the optical paths, and
   wherein the path sequence is a preselected sequence, and wherein only one of the optical paths is used during each of the transmission periods.

8. An optical communication network transmitter module as claimed in claim 7 and comprising:
   a plurality of optical transmitters each arranged to operate at a different one of a plurality of optical channels and each coupled to a respective one of the optical outputs; and
   a digital wrapping element arranged to digitally wrap the communications traffic, and wherein the at least one transmitter control signal contains instructions arranged to cause the optical transmitters to transmit, over the series of transmission periods, the digitally wrapped communications traffic as a series of traffic portions, the instructions arranged to cause each traffic portion to be transmitted for a respective preselected one of the transmission periods by a respective optical transmitter according to the path sequence.

9. An optical communication network transmitter module as claimed in claim 7, wherein the communications traffic in each said traffic portion is only able to be reconstructed when recombined with at least one other said traffic portion.

10. An optical communication network receiver module comprising:
   a plurality of inputs, each arranged to be coupled to a respective one of a plurality of optical paths across an optical communication network from a source node to the receiver module, at least part of each optical path being spatially separate from each other optical path;
   a plurality of optical receivers each coupled to a respective one of the inputs; and a module controller arranged to:
      obtain a path sequence defining an order in which the plurality of optical paths across the optical communication network are to be used;
      receive, over a series of transmission periods, a series of traffic portions, each traffic portion being received for a respective preselected one of the transmission periods on a respective optical channel from a respective one of the optical paths according to the path sequence, wherein reception of the series of traffic portions is distributed among the optical paths, and
      reconstruct the communications traffic from the received traffic portions according to the path sequence,
   wherein the path sequence is a preselected sequence, and wherein only one of the optical paths is used during each of the transmission periods.

11. An optical communication network receiver module as claimed in 10, wherein the communications traffic in each said traffic portion is only able to be reconstructed when recombined with at least one other said traffic portion.

12. An optical communication network comprising:
   a source node comprising an optical communication network transmitter module comprising:
      an input arranged to receive communications traffic to be transmitted;
      a plurality of outputs, each arranged to be coupled to a respective one of a plurality of optical paths across an optical communication network;
      an optical transmitter; and
      a module controller arranged to:
         obtain a path sequence defining an order in which a plurality of optical paths from the transmitter module to a target node across the optical communication network are to be used, at least part of each optical path being spatially separate from each other optical path; and
         generate and transmit at least one transmitter control signal containing instructions arranged to cause the optical transmitter to transmit, over a series of transmission periods, the communications traffic as a series of traffic portions, the instructions arranged to cause each traffic portion to be transmitted for a respective preselected one of the transmission periods on a respective one of the optical paths according to the path sequence, wherein transmission of the series of traffic portions is distributed among the optical paths;
   a target node comprising an optical communication network receiver module comprising:
      a plurality of inputs, each arranged to be coupled to a respective one of a plurality of optical paths across an optical communication network from a source node to the receiver module, at least part of each optical path being spatially separate from each other optical path;
      a plurality of optical receivers each coupled to a respective one of the inputs; and
      a module controller arranged to:
         obtain a path sequence defining an order in which the plurality of optical paths across the optical communication network are to be used;
         receive, over a series of transmission periods, a series of traffic portions, each traffic portion being received for a respective preselected one of the transmission periods on a respective optical channel from a respective optical path according to the path sequence; and
         reconstruct the communications traffic from the received traffic portions according to the path sequence;
   a plurality of intermediate nodes;

a plurality of optical fibre links each connecting a pair of the nodes; and a network control element arranged to:

configure a plurality of optical paths from the source node to the target node across the optical communication network, at least part of each optical path being spatially separate from each other optical path; and generate a path sequence defining an order in which the optical paths are to be used, wherein the path sequence is a preselected sequence, and wherein only one of the optical paths is used during each of the transmission periods.

13. An optical communication network as claimed in claim 12, wherein the network control element is arranged to configure the optical paths such that the spatially separate parts of the optical paths comprise one of physically distinct paths across the optical communication network, different optical fibres following a shared physical path across the optical communication network and different optical fibres within an optical fibre cable within the optical communication network.

14. An optical communication network as claimed in claim 12, wherein the communications traffic has a security level and the network control element is arranged to configure a plurality of optical paths proportional to the security level.

15. An optical communication network as claimed in claim 12, wherein the network control element is arranged to generate a dynamically changing path sequence by pseudo randomly generating a sequence of the optical paths and wherein the network control element is further arranged to generate and transmit a path sequence signal to the source node and to the target node.

16. A method as claimed in claim 1, wherein the communications traffic in each said traffic portion can only be reconstructed when recombined with at least one other said traffic portion.

17. A method as claimed in claim 1, wherein the spatially separate parts of the optical paths comprise one of physically distinct paths across the optical communication network, different optical fibre cables following a shared physical path across the optical communication network and different optical fibres within an optical fibre cable within the optical communication network.

* * * * *